United States Patent
Crimins et al.

(10) Patent No.: US 10,088,192 B2
(45) Date of Patent: Oct. 2, 2018

(54) THERMOSTAT ALGORITHMS AND ARCHITECTURE FOR EFFICIENT OPERATION AT LOW TEMPERATURES

(71) Applicant: Google LLC, Mountain View, CA (US)

(72) Inventors: Jonathan Crimins, Los Altos, CA (US); Scott Ruffner, San Francisco, CA (US); Allen Minich, Mountain View, CA (US); Todd Hester, London (GB); Amanda Sahl, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 133 days.

(21) Appl. No.: 15/286,564

(22) Filed: Oct. 6, 2016

(65) Prior Publication Data
US 2018/0100663 A1    Apr. 12, 2018

(51) Int. Cl.
*F24F 11/00*    (2018.01)
*F24F 11/30*    (2018.01)
(Continued)

(52) U.S. Cl.
CPC .......... *F24F 11/30* (2018.01); *F24D 19/1087* (2013.01); *F24F 11/62* (2018.01);
(Continued)

(58) Field of Classification Search
CPC ........ F24F 2110/10; F24F 11/30; F24F 11/62; F24F 11/0086; F24F 11/006;
(Continued)

(56) References Cited

U.S. PATENT DOCUMENTS 4,881,686 A * 11/1989 Mehta .................... F23N 5/203
236/46 R
5,270,952 A * 12/1993 Adams ............... G05D 23/1904
165/239
(Continued)

FOREIGN PATENT DOCUMENTS

WO    WO-2013058820 A1 *   4/2013    ......... G05D 23/1902

OTHER PUBLICATIONS

James Scott, A.J. Bernheim Brush, John Krumm, Brian Meyers, Michael Hazas, Stephen Hodges, and Nicolas Villar. 2011. PreHeat: controlling home heating using occupancy prediction. In Proceedings of the 13th international conference on Ubiquitous computing (UbiCom '11). ACM, New York, NY, USA, 281-290.*
(Continued)

*Primary Examiner* — Christopher E. Everett
(74) *Attorney, Agent, or Firm* — Kilpatrick Townsend & Stockton LLP

(57) ABSTRACT

A thermostat may be programmed to operate during cold-weather months by operating in a heat mode where the thermostat periodically causes the HVAC system to activate a heating function to heat an enclosure based at least in part on the stored setpoint schedule; receiving an indication from a thermostat management server of a demand response event while the thermostat is operating in the heat mode; determining whether the thermostat stores a user setting indicating that the thermostat should preheat the enclosure prior to reaching a scheduled setpoint in the stored setpoint schedule; and preheating the enclosure prior to the demand response event based on a determination that the thermostat stores the user setting indicating that the thermostat should preheat the enclosure prior to reaching the scheduled setpoint in the stored setpoint schedule.

20 Claims, 24 Drawing Sheets

(51) Int. Cl.
*F24D 19/10* (2006.01)
*G05D 23/19* (2006.01)
*G05B 19/048* (2006.01)
*F24F 11/62* (2018.01)
*F24F 11/64* (2018.01)
*F24F 11/65* (2018.01)
*F24F 130/00* (2018.01)

(52) U.S. Cl.
CPC ....... *G05B 19/048* (2013.01); *G05D 23/1917* (2013.01); *F24F 11/64* (2018.01); *F24F 11/65* (2018.01); *F24F 2130/00* (2018.01); *G05B 2219/2614* (2013.01)

(58) Field of Classification Search
CPC ............... F24F 11/0012; F24F 2130/10; F24F 2130/00; F24F 11/65; F24F 2140/50; F24F 11/64; F24F 2011/0058; F24F 2011/0064; F24F 2011/0063; F24F 2011/0046; F24D 19/1087; G05B 19/048; G05B 2219/2614; G05D 23/1917
See application file for complete search history.

(56) References Cited

U.S. PATENT DOCUMENTS

| | | | | |
|---|---|---|---|---|
| 8,538,586 | B2* | 9/2013 | Amundson | G05D 23/1923 700/276 |
| 8,600,561 | B1* | 12/2013 | Modi | G05D 23/19 700/276 |
| 8,630,742 | B1* | 1/2014 | Stefanski | H05B 1/028 700/278 |
| 2004/0117330 | A1 | 6/2004 | Ehlers | G06Q 10/10 705/412 |
| 2005/0194456 | A1* | 9/2005 | Tessier | F24F 11/006 236/51 |
| 2010/0070091 | A1* | 3/2010 | Watson | G06Q 50/06 700/278 |
| 2011/0029139 | A1* | 2/2011 | Altonen | E06B 9/68 700/278 |
| 2011/0031806 | A1* | 2/2011 | Altonen | E06B 9/68 307/32 |
| 2011/0035061 | A1* | 2/2011 | Altonen | E06B 9/68 700/278 |
| 2012/0001487 | A1* | 1/2012 | Pessina | E06B 9/68 307/31 |
| 2012/0091213 | A1* | 4/2012 | Altonen | H05B 37/02 236/51 |
| 2012/0091804 | A1* | 4/2012 | Altonen | E06B 9/68 307/31 |
| 2012/0095601 | A1* | 4/2012 | Abraham | E06B 9/68 700/278 |
| 2012/0296491 | A1* | 11/2012 | Schmid | H02J 3/16 700/298 |
| 2012/0323393 | A1* | 12/2012 | Imhof | G05B 15/02 700/297 |
| 2013/0085614 | A1* | 4/2013 | Wenzel | G05D 23/1923 700/277 |
| 2013/0113284 | A1* | 5/2013 | Altonen | H02J 3/12 307/31 |
| 2013/0153195 | A1* | 6/2013 | Wallaert | F24F 11/0012 165/239 |
| 2013/0190940 | A1* | 7/2013 | Sloop | G05B 15/02 700/291 |
| 2013/0193928 | A1* | 8/2013 | Prosser | H02J 7/0042 320/130 |
| 2013/0231792 | A1* | 9/2013 | Ji | G05B 19/02 700/291 |
| 2013/0274940 | A1* | 10/2013 | Wei | G05B 19/02 700/291 |
| 2013/0345882 | A1* | 12/2013 | Dushane | G05B 15/02 700/276 |
| 2014/0001846 | A1* | 1/2014 | Mosebrook | H04L 12/2816 307/11 |
| 2014/0074306 | A1* | 3/2014 | Lu | G06N 3/126 700/291 |
| 2014/0203092 | A1* | 7/2014 | Broniak | F24D 19/1087 237/12 |
| 2014/0277769 | A1* | 9/2014 | Matsuoka | F24F 11/30 700/278 |
| 2015/0100171 | A1* | 4/2015 | Behrangrad | H02J 3/12 700/291 |
| 2015/0192911 | A1* | 7/2015 | Sloop | G05B 15/02 700/291 |
| 2015/0277465 | A1* | 10/2015 | Deligiannis | G05F 1/66 700/295 |
| 2015/0378381 | A1* | 12/2015 | Tinnakornsrisuphap | G05F 1/66 700/276 |
| 2016/0018124 | A1* | 1/2016 | Yamamoto | F24F 11/00 700/276 |
| 2016/0025364 | A1* | 1/2016 | Mills, Jr. | F24F 11/62 700/278 |
| 2016/0131378 | A1* | 5/2016 | Hinokuma | F24F 11/001 62/126 |

OTHER PUBLICATIONS ecobee, Smart Thermostat: User Manual, UM-STAT-106-R4, 2010.*

\* cited by examiner

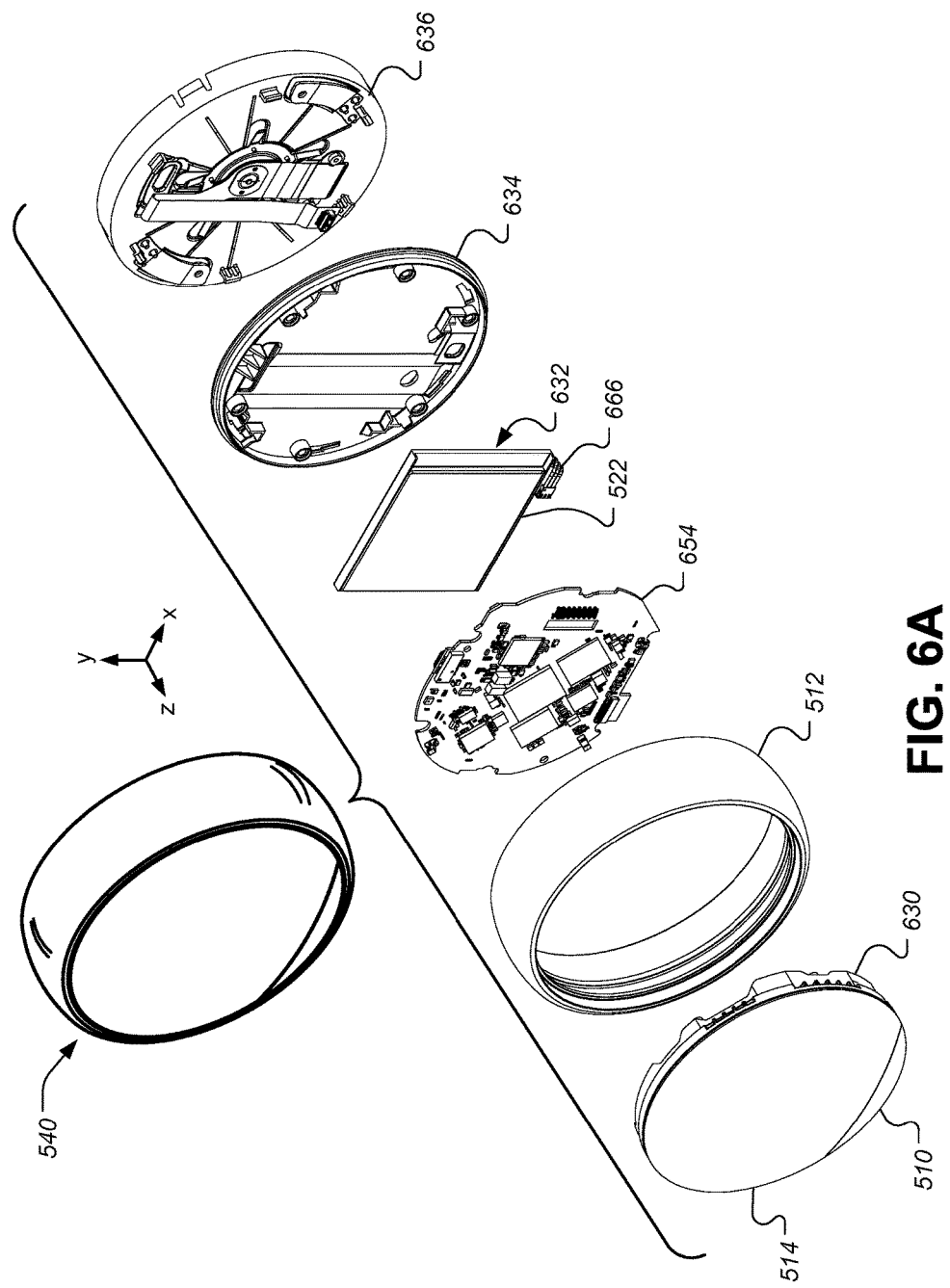

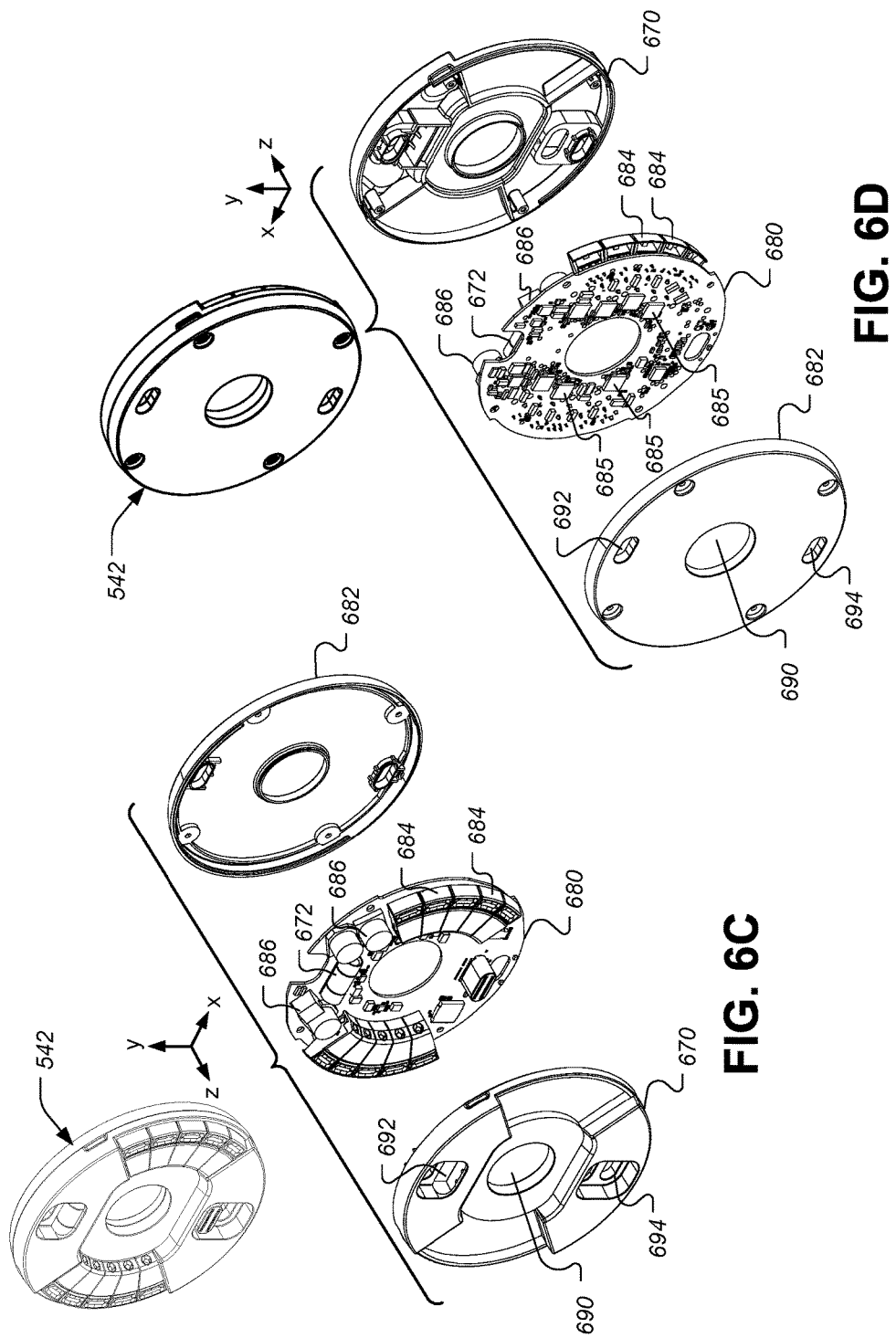

| 1402 ⤵ | |
|---|---|
| Demand Response CZ Schema Definition ||
| event_type | Demand Response type ("REGULAR_RHR") |
| id | Identifies instance of DR event |
| optimization_parameters | Parameters sent to thermostat to influence event |
| peak_start | End of preparation interval |
| peak_stop | End of DR event |
| ⋮    1404 ⤴    ⋮ 1406 ⤵ ||
| fuel_type | The fuel type that the event should optimize for: "ELECTRIC", "GAS", "OIL", "PROPANE", or "GEOTHERMAL." Assume "ELECTRIC" in the absence of this field. |
| obey_preconditioning_setting | Whether to honor the user's preconditioning setting when determining whether to run additional HVAC during the preparation window. Default: false. |
| num_rollouts | Number of rollouts thermostat controller should perform on each reevaluation |
| one_sided_temp_error | Whether to use one-sided temperature error instead of double-sided error when quantifying user discomfort. Default: false. |
| obey_heatpump_lockouts | Whether to honor the user's heatpump lockouts on heatpump + aux systems. Default: false. |
| use_one_sided_temp_error | Whether to honor the user's dual fuel breakpoint on dual fuel systems |

FIG. 14

DR Thermostat Control Equation $$\underbrace{w_1 \times (\text{user\_comfort})}_{\text{decrease?}}^{1702} + \underbrace{w_2 \times (\text{heat\_pump})}_{\text{Increase less than 10x}}^{1704} \underbrace{\phantom{w_2}}_{1706}^{1708} + \underbrace{w_3 \times (\text{AUX})}_{\text{Increase 10x-25x}}^{1710\ 1712} + \ldots = Min^{1714}$$

FIG. 17

THERMOSTAT ALGORITHMS AND ARCHITECTURE FOR EFFICIENT OPERATION AT LOW TEMPERATURES

BACKGROUND

A demand response event includes a request by an electric utility to change electrical consumption of individual HVAC systems in order to reduce demand for power from the electrical grid. Because electric energy cannot be easily stored, utility providers attempt to match electrical demand current with supply current by throttling energy production, which can cause an electricity shortage to customer's thermostats and HVAC systems. During a demand response event where demand for electricity is high, thermostats are able to voluntarily reduce energy consumption in individual HVAC systems in order to reduce overall electrical demand on the electrical grid. These demand response events typically take place during summer months in the late afternoon when most customers run their air conditioning systems.

BRIEF SUMMARY

In some embodiments, a thermostat may include a housing, one or more memory devices comprising a stored setpoint schedule with a plurality of setpoints, one or more temperature sensors, each of the one or more temperature sensors being configured to provide temperature sensor measurements, and a processing system disposed within the housing. The processing system may be configured to be in operative communication with the one or more temperature sensors to receive the temperature sensor measurements, in operative communication with the one or more memory devices to determine a setpoint temperature, and in still further operative communication with a heating, ventilation, and air conditioning (HVAC) system to control the HVAC system based at least in part on the setpoint temperature and the temperature sensor measurements. The processing system may be programmed or configured to control the HVAC system by performing operations including operating in a heat mode wherein the thermostat periodically causes the HVAC system to activate a heating function to heat an enclosure based at least in part on the stored setpoint schedule. The operations may also include receiving an indication from a thermostat management server of a demand response event while the thermostat is operating in the heat mode. The operations may additionally include determining whether the thermostat stores a user setting indicating that the thermostat should preheat the enclosure prior to reaching a scheduled setpoint in the stored setpoint schedule. The operations may further include preheating the enclosure prior to the demand response event based on a determination that the thermostat stores the user setting indicating that the thermostat should preheat the enclosure prior to reaching the scheduled setpoint in the stored setpoint schedule.

In some embodiments, a method of using a thermostat to control an HVAC system during cold weather may include storing a stored setpoint schedule in one or more memory devices of the thermostat, where the stored setpoint schedule may include a plurality of setpoints. The method may also include receiving temperature sensor measurements from one or more temperature sensors. The method may additionally include controlling a heating, ventilation, and air conditioning (HVAC) system using a processing system of the thermostat, where the processing system may be configured to be in operative communication with the one or more temperature sensors to receive the temperature sensor measurements, in operative communication with the one or more memory devices to determine a setpoint temperature, and in still further operative communication with HVAC system to control the HVAC system based at least in part on the setpoint temperature and the temperature sensor measurements. The method may further include operating, by the processing system, the thermostat in a heat mode wherein the thermostat periodically causes the HVAC system to activate a heating function to heat an enclosure based at least in part on the stored setpoint schedule. The method may also include receiving, by the processing system, an indication from a thermostat management server of a demand response event while the thermostat is operating in the heat mode. The method may additionally include determining, by the processing system, whether the thermostat stores a user setting indicating that the thermostat should preheat the enclosure prior to reaching a scheduled setpoint in the stored setpoint schedule. The method may further include preheating, by the processing system, the enclosure prior to the demand response event based on a determination that the thermostat stores the user setting indicating that the thermostat should preheat the enclosure prior to reaching the scheduled setpoint in the stored setpoint schedule.

In any of the embodiments described herein, any of the following features may be included in any combination and without limitation. The demand response event may be a winter demand response event occurring between December and March. The user setting indicating that the thermostat should preheat the enclosure prior to reaching the scheduled setpoint may utilize a time-to-temperature calculation based on a thermal model of the enclosure and heating characteristics of the HVAC system. The method/operations may include increasing a nighttime setback temperature prior to the demand response event. The method/operations may also include reducing the likelihood that an AUX function of a heat pump of the HVAC system will operate while preheating the enclosure prior to the demand response event. The method/operations may further include minimizing a control function during the demand response event, wherein the control function may include: a first function representing operation of a heat pump, a second function representing operation of an AUX function, and a third function representing a numerical representation of user comfort. The method/operations may also include increasing a weight applied to the second function representing operation of an AUX function during the demand response event. The weight applied to the second function may be increased between 10× and 25× during the demand response event. The method/operations may additionally include increasing a weight applied to the first function representing operation of a heat pump during the demand response event. The method/operations may further include increasing an upper or lower bound of a maintenance band around a setpoint temperature during the demand response event.

BRIEF DESCRIPTION OF THE DRAWINGS

FIG. 6A illustrates an exploded front perspective view of a head unit with respect to its primary components, according to some embodiments.

FIGS. 6C-6D illustrate exploded front and rear perspective views, respectively, of a back plate unit with respect to its primary components, according to some embodiments.

FIG. 14 illustrates a data structure for representing a demand response event definition, according to some embodiments.

FIG. 17 illustrates a portion of a control equation used by the thermostat to control operations during the demand response interval, according to some embodiments.

DETAILED DESCRIPTION OF THE INVENTION

The Smart-Home Environment

A detailed description of the inventive body of work is provided herein. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to thermostats that are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

Figure 1:
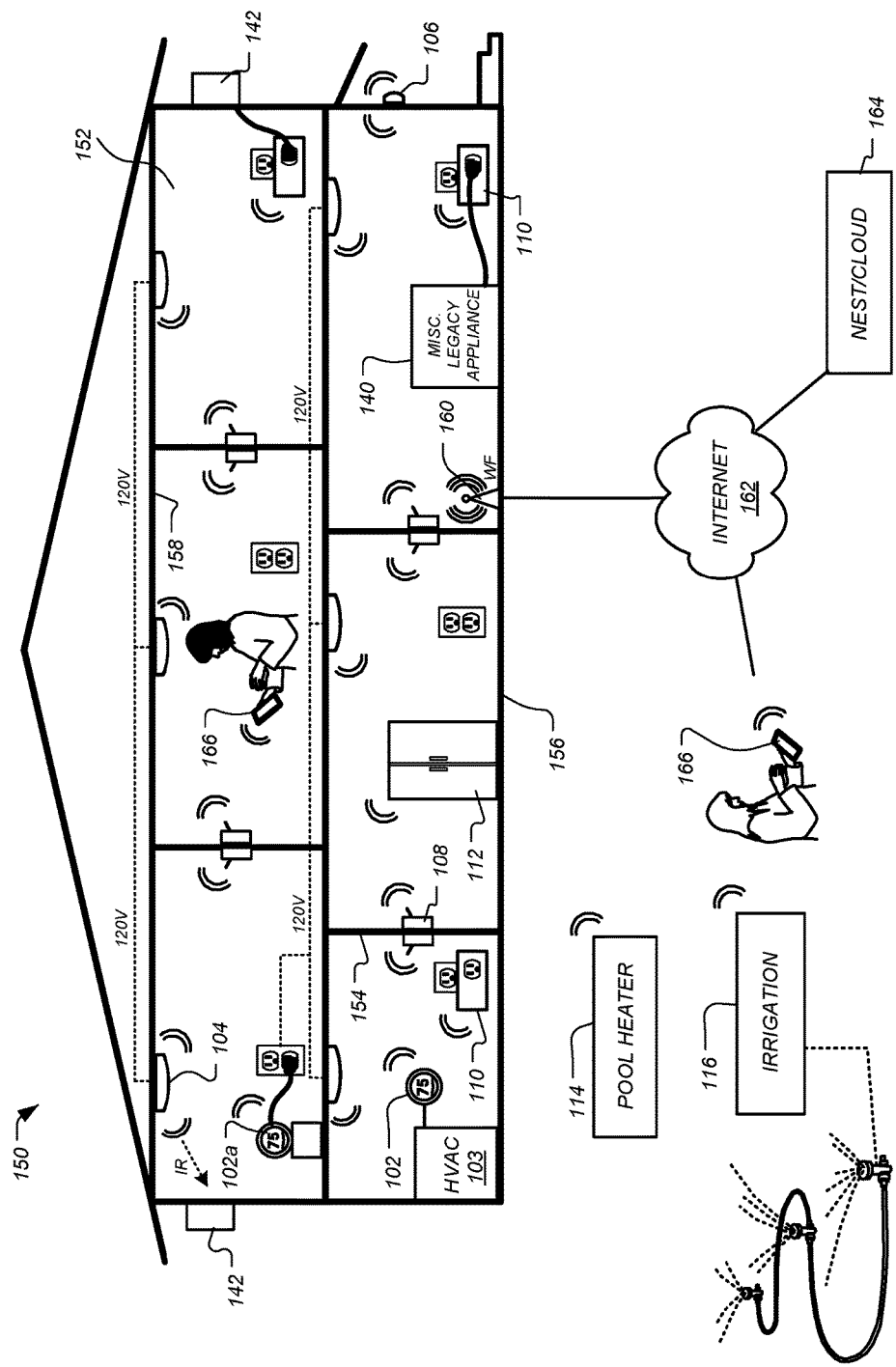
FIG. 1 illustrates an example of a smart home environment within which one or more of the devices, methods, systems, services, and/or computer program products described further herein can be applicable.

FIG. 1 illustrates an example of a smart home environment within which one or more of the devices, methods, systems, services, and/or computer program products described further herein can be applicable. The depicted smart home environment includes a structure 150, which can include, e.g., a house, office building, garage, or mobile home. It will be appreciated that devices can also be integrated into a smart home environment that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor or ceiling.

The smart home depicted in FIG. 1 includes a plurality of devices, including intelligent, multi-sensing, network-connected devices that can integrate seamlessly with each other and/or with cloud-based server systems to provide any of a variety of useful smart home objectives. One, more or each of the devices illustrated in the smart home environment and/or in the figure can include one or more sensors, a user interface, a power supply, a communications component, a modularity unit and intelligent software as described herein. Examples of devices are shown in FIG. 1.

An intelligent, multi-sensing, network-connected thermostat 102 can detect ambient climate characteristics (e.g., temperature and/or humidity) and control a heating, ventilation and air-conditioning (HVAC) system 103. One or more intelligent, network-connected, multi-sensing hazard detection units 104 can detect the presence of a hazardous substance and/or a hazardous condition in the home environment (e.g., smoke, fire, or carbon monoxide). One or more intelligent, multi-sensing, network-connected entryway interface devices 106, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 108 can detect ambient lighting conditions, detect room-occupancy states and control a power and/or dim state of one or more lights. In some instances, light switches 108 can further or alternatively control a power state or speed of a fan, such as a ceiling fan. Each of a plurality of intelligent, multi-sensing, network-connected wall plug interfaces 110 can detect occupancy of a room or enclosure and control supply of power to one or more wall plugs (e.g., such that power is not supplied to the plug if nobody is at home). The smart home may further include a plurality of intelligent, multi-sensing, network-connected appliances 112, such as refrigerators, stoves and/or ovens, televisions, washers, dryers, lights (inside and/or outside the structure 150), stereos, intercom systems, garage-door openers, floor fans, ceiling fans, whole-house fans, wall air conditioners, pool heaters 114, irrigation systems 116, security systems (including security system components such as cameras, motion detectors and window/door sensors), and so forth. While descriptions of FIG. 1 can identify specific sensors and functionalities associated with specific devices, it will be appreciated that any of a variety of sensors and functionalities (such as those described throughout the specification) can be integrated into the device.

In addition to containing processing and sensing capabilities, each of the devices 102, 104, 106, 108, 110, 112, 114 and 116 can be capable of data communications and information sharing with any other of the devices 102, 104, 106, 108, 110, 112, 114 and 116, as well as to any cloud server or any other device that is network-connected anywhere in the world. The devices can send and receive communications via any of a variety of custom or standard wireless protocols (Wi-Fi, ZigBee, 6LoWPAN, Thread, Bluetooth, BLE, HomeKit Accessory Protocol (HAP), Weave, etc.) and/or any of a variety of custom or standard wired protocols (CAT6 Ethernet, HomePlug, etc.). The wall plug interfaces 110 can serve as wireless or wired repeaters, and/or can function as bridges between (i) devices plugged into AC outlets and communicating using Homeplug or other power line protocol, and (ii) devices that not plugged into AC outlets.

For example, a first device can communicate with a second device via a wireless router 160. A device can further communicate with remote devices via a connection to a network, such as the Internet 162. Through the Internet 162, the device can communicate with a central server or a cloud-computing system 164. The central server or cloud-computing system 164 can be associated with a manufacturer, support entity or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

By virtue of network connectivity, one or more of the smart-home devices of FIG. 1 can further allow a user to interact with the device even if the user is not proximate to the device. For example, a user can communicate with a device using a computer (e.g., a desktop computer, laptop computer, or tablet) or other portable electronic device (e.g., a smartphone). A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home also can include a variety of non-communicating legacy appliances 140, such as old conventional washer/dryers, refrigerators, and the like which can be controlled, albeit coarsely (ON/OFF), by virtue of the wall plug interfaces 110. The smart home can further include a variety of partially communicating legacy appliances 142, such as IR-controlled wall air conditioners or other IR-controlled devices, which can be controlled by IR signals provided by the hazard detection units 104 or the light switches 108.

Figure 2:
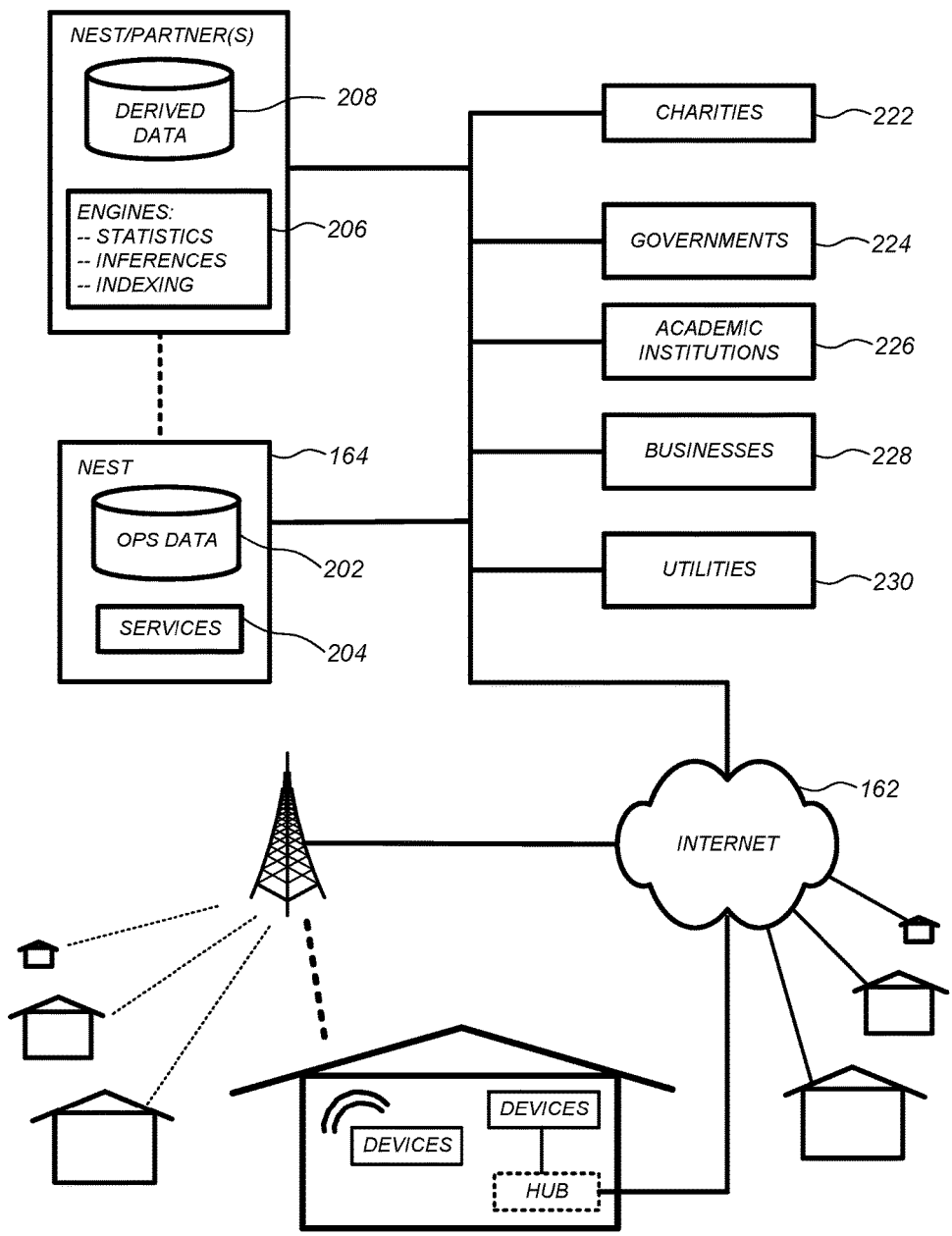
FIG. 2 illustrates a network-level view of an extensible devices and services platform with which the smart home of FIG. 1 can be integrated, according to some embodiments.

FIG. 2 illustrates a network-level view of an extensible devices and services platform with which the smart home of FIG. 1 can be integrated, according to some embodiments. Each of the intelligent, network-connected devices from FIG. 1 can communicate with one or more remote central servers or cloud computing systems 164. The communication can be enabled by establishing connection to the Internet 162 either directly (for example, using 3G/4G connectivity to a wireless carrier), though a hubbed network (which can be scheme ranging from a simple wireless router, for example, up to and including an intelligent, dedicated whole-home control node), or through any combination thereof.

The central server or cloud-computing system 164 can collect operation data 202 from the smart home devices. For example, the devices can routinely transmit operation data or can transmit operation data in specific instances (e.g., when requesting customer support). The central server or cloud-computing architecture 164 can further provide one or more services 204. The services 204 can include, e.g., software update, customer support, sensor data collection/logging, remote access, remote or distributed control, or use suggestions (e.g., based on collected operation data 204 to improve performance, reduce utility cost, etc.). Data associated with the services 204 can be stored at the central server or cloud-computing system 164 and the central server or cloud-computing system 164 can retrieve and transmit the data at an appropriate time (e.g., at regular intervals, upon receiving request from a user, etc.).

One salient feature of the described extensible devices and services platform, as illustrated in FIG. 2, is a processing engines 206, which can be concentrated at a single server or distributed among several different computing entities without limitation. Processing engines 206 can include engines configured to receive data from a set of devices (e.g., via the Internet or a hubbed network), to index the data, to analyze the data and/or to generate statistics based on the analysis or as part of the analysis. The analyzed data can be stored as derived data 208. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the Internet 162. In this manner, processing engines 206 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engines 206 can generate statistics about device usage across a population of devices and send the statistics to device users, service providers or other entities (e.g., that have requested or may have provided monetary compensation for the statistics). As specific illustrations, statistics can be transmitted to charities 222, governmental entities 224 (e.g., the Food and Drug Administration or the Environmental Protection Agency), academic institutions 226 (e.g., university researchers), businesses 228 (e.g., providing device warranties or service to related equipment), or utility companies 230. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 3:
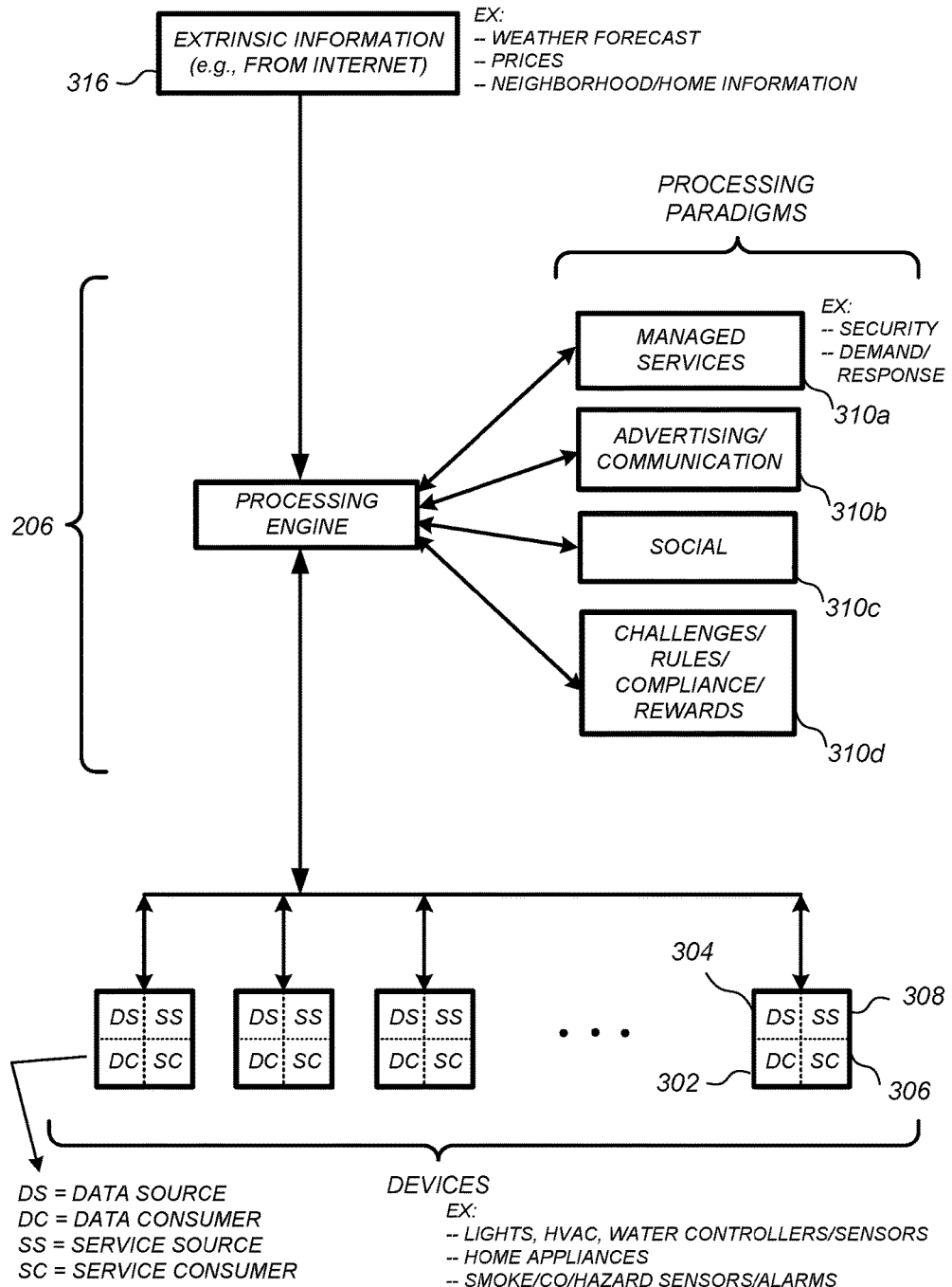
FIG. 3 illustrates an abstracted functional view of the extensible devices and services platform of FIG. 2, according to some embodiments.

FIG. 3 illustrates an abstracted functional view of the extensible devices and services platform of FIG. 2, with particular reference to the processing engine 206 as well as the devices of the smart home. Even though the devices situated in the smart home will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310*a* that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310*b* that estimates characteristics (e.g., demographic information), desires and/or products of interest of a user based on device usage. Services, promotions, products or upgrades can then be offered or automatically provided to the user. Processing engine 206 can further include a social paradigm 310*c* that uses information from a social network, provides information to a social network (for example, based on device usage), processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 206 can include a challenges/rules/compliance/rewards paradigm 310*d* that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine can integrate or otherwise utilize extrinsic information 316 from extrinsic sources to improve the functioning of one or more processing paradigms. Extrinsic information 316 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available for processing (properly anonymized) in which the sleep patterns of school children in a particular ZIP code can be identified and tracked. Localized variations in the sleeping patterns of the school children may be identified and correlated, for example, to different nutrition programs in local schools.

Figure 4:
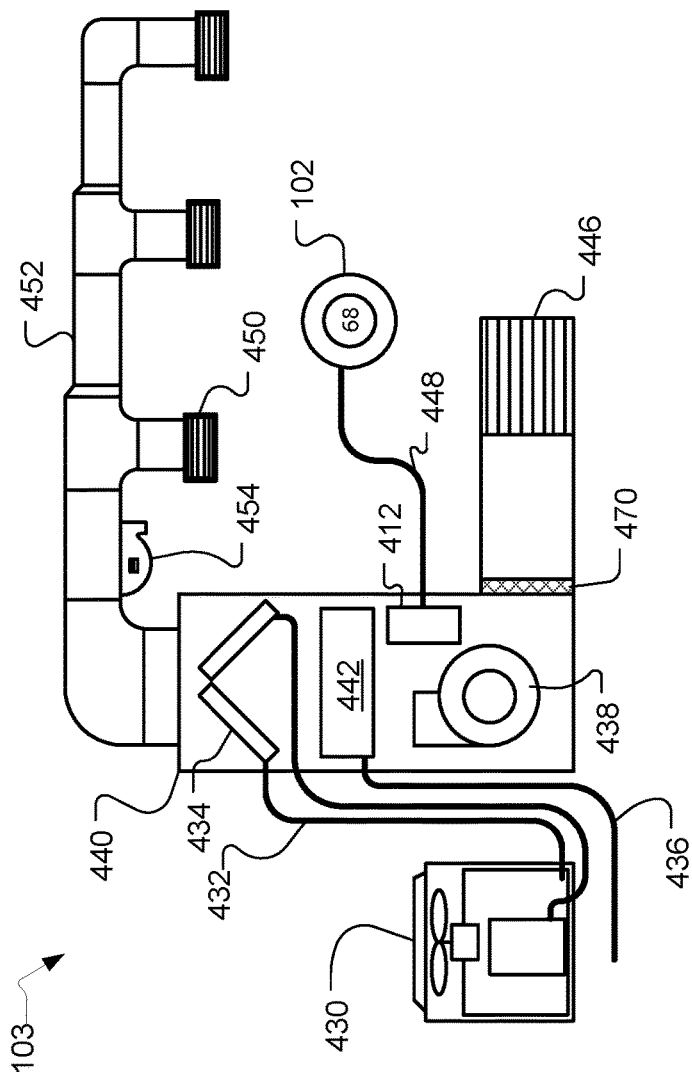
FIG. 4 illustrates a schematic diagram of an HVAC system, according to some embodiments.

FIG. 4 is a schematic diagram of an HVAC system, according to some embodiments. HVAC system 103 provides heating, cooling, ventilation, and/or air handling for an enclosure, such as structure 150 depicted in FIG. 1. System 103 depicts a forced air type heating and cooling system, although according to other embodiments, other types of HVAC systems could be used such as radiant heat based systems, heat-pump based systems, and others.

For carrying out the heating function, heating coils or elements 442 within air handler 440 provide a source of heat using electricity or gas via line 436. Cool air is drawn from the enclosure via return air duct 446 through filter 470, using fan 438 and is heated through heating coils or elements 442. The heated air flows back into the enclosure at one or more locations via supply air duct system 452 and supply air registers such as register 450. In cooling, an outside compressor 430 passes a refrigerant gas through a set of heat exchanger coils and then through an expansion valve. The gas then goes through line 432 to the cooling coils or evaporator coils 434 in the air handler 440 where it expands, cools and cools the air being circulated via fan 438. A humidifier 454 may optionally be included in various embodiments that returns moisture to the air before it passes through duct system 452. Although not shown in FIG. 4, alternate embodiments of HVAC system 103 may have other functionality such as venting air to and from the outside, one or more dampers to control airflow within the duct system 452 and an emergency heating unit. Overall operation of HVAC system 103 is selectively actuated by control electronics 412 communicating with thermostat 102 over control wires 448.

The Smart-Home Thermostat

Figure 5A:
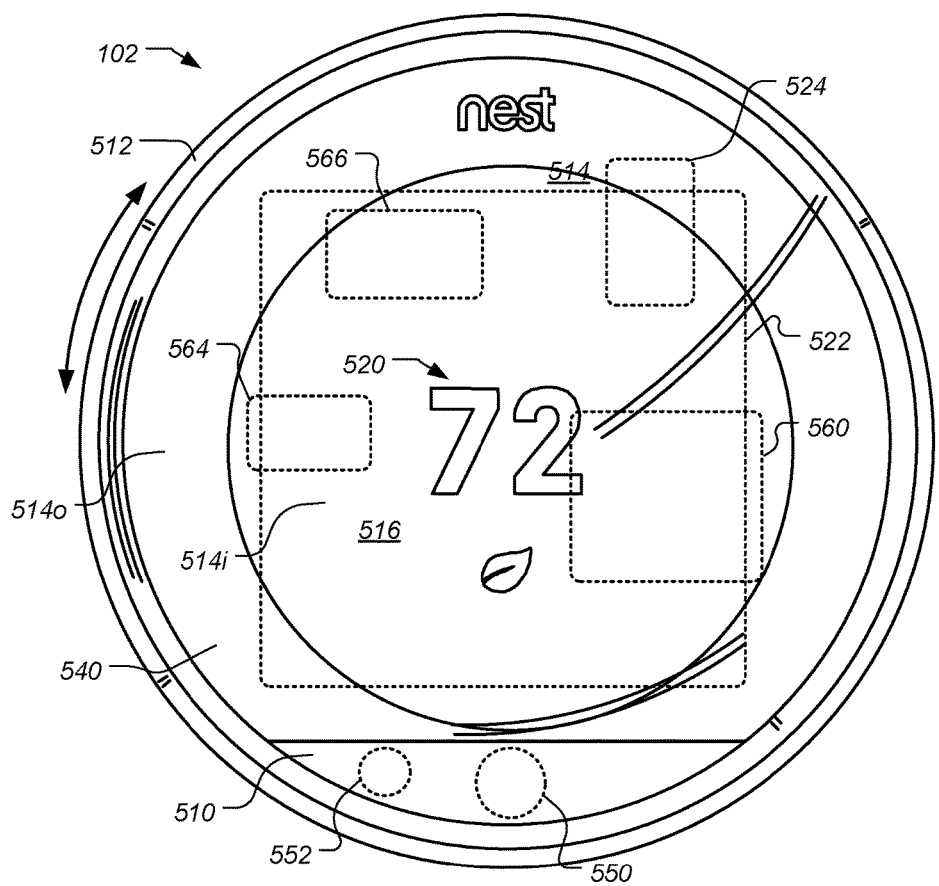
FIG. 5A-5B illustrate a thermostat having a visually pleasing, smooth, sleek and rounded exterior appearance while at the same time including one or more sensors for detecting occupancy and/or users, according to some embodiments.
Figure 5B:
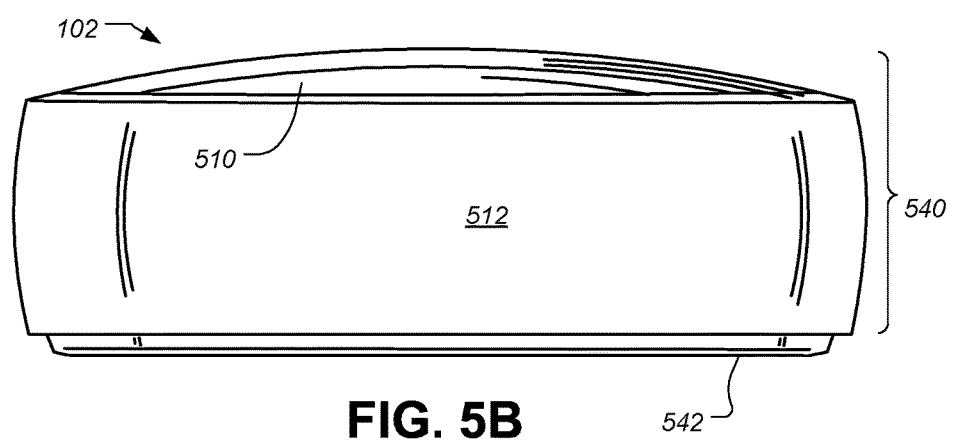

FIGS. 5A-5B illustrate a thermostat having a rounded exterior appearance and including one or more sensors for detecting environmental conditions, such as occupancy and/or users, temperature, ambient light, humidity, and so forth. FIG. 5A is front view, and FIG. 5B is a bottom elevation view of thermostat 102. Unlike many prior art thermostats, thermostat 102 has a simple and elegant design. Moreover, user interaction with thermostat 102 is facilitated and greatly enhanced over known conventional thermostats. The thermostat 102 includes control circuitry and is electrically connected to an HVAC system 103, such as is shown in FIGS. 1-4. Thermostat 102 is wall mountable, is circular in shape, and has an outer rotatable ring 512 for receiving user input. Thermostat 102 has a large convex rounded front face lying inside the outer rotatable ring 512. According to some embodiments, thermostat 102 is approximately 84 mm in diameter and protrudes from the wall, when wall mounted, by 30 mm. The outer rotatable ring 512 allows the user to make adjustments, such as selecting a new setpoint temperature. For example, by rotating the outer ring 512 clockwise, the real-time (i.e. currently active) setpoint temperature can be increased, and by rotating the outer ring 512 counter-clockwise, the real-time setpoint temperature can be decreased.

The front face of the thermostat 102 comprises a cover 514 that according to some embodiments is polycarbonate, and a lens 510 having an outer shape that matches the contours of the curved outer front face of the thermostat 102. According to some embodiments, Fresnel lens elements may are formed on the interior surface of the lens 510 such that they are not obviously visible by viewing the exterior of the thermostat 102. Behind the lens 510 is a passive infrared (PIR) sensor 550 for detecting occupancy, a temperature sensor that is thermally coupled to the lens 510, and a multi-channel thermopile for detecting occupancy, user approaches, and motion signatures. The Fresnel lens elements of the lens 510 are made from a high-density polyethylene (HDPE) that has an infrared transmission range appropriate for sensitivity to human bodies. The lens 510 may also include thin sections that allow a near-field proximity sensor 552, such as a multi-channel thermopile, and a temperature sensor to "see-through" the lens 510 with minimal interference from the polyethylene. As shown in FIGS. 5A-5B, the front edge of the outer rotatable ring 512, cover 514, and lens 510 are shaped such that they together form an integrated convex rounded front face that has a common outward arc or spherical shape arcing outward.

Although being formed from a single lens-like piece of material such as polycarbonate, the cover 514 has two different regions or portions including an outer portion 514o and a central portion 514i. According to some embodiments, the cover 514 is darkened around the outer portion 514o, but leaves the central portion 514i visibly clear so as to facilitate viewing of an electronic display 516 disposed underneath. According to some embodiments, the cover 514 acts as a lens that tends to magnify the information being displayed in electronic display 516 to users. According to some embodiments the central electronic display 516 is a dot-matrix layout (i.e. individually addressable) such that arbitrary shapes can be generated. According to some embodiments, electronic display 516 is a backlit, color liquid crystal display (LCD). An example of information displayed on the electronic display 516 is illustrated in FIG. 5A, and includes central numerals 520 that are representative of a current setpoint temperature. The thermostat 102 may be constructed such that the electronic display 516 is at a fixed orientation and does not rotate with the outer rotatable ring 512. For some embodiments, the cover 514 and lens 510 also remain at a fixed orientation and do not rotate with the outer ring 512. In alternative embodiments, the cover 514 and/or the lens 510 can rotate with the outer rotatable ring 512. According to one embodiment in which the diameter of the thermostat 102 is about 84 mm, the diameter of the electronic display 516 is about 54 mm. According to some embodiments the curved shape of the front surface of thermostat 102, which is made up of the cover 514, the lens 510 and the front facing portion of the ring 512, is spherical, and matches a sphere having a radius of between 100 mm and 180 mm. According to some embodiments, the radius of the spherical shape of the thermostat front is about 156 mm.

Motion sensing with PIR sensor 550 as well as other techniques can be used in the detection and/or prediction of occupancy. According to some embodiments, occupancy information is used in generating an effective and efficient scheduled program. A second near-field proximity sensor 552 is also provided to detect an approaching user. The near-field proximity sensor 552 can be used to detect proximity in the range of up to 10-15 feet. the PIR sensor 550 and/or the near-field proximity sensor 552 can detect user presence such that the thermostat 102 can initiate "waking up" and/or providing adaptive screen displays that are based on user motion/position when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place.

According to some embodiments, the thermostat 102 may be controlled by at least two types of user input, the first being a rotation of the outer rotatable ring 512 as shown in FIG. 5A, and the second being an inward push on head unit 540 until an audible and/or tactile "click" occurs. For such embodiments, the head unit 540 is an assembly that includes the outer ring 512, the cover 514, the electronic display 516, and the lens 510. When pressed inwardly by the user, the head unit 540 travels inwardly by a small amount, such as 0.5 mm, against an interior switch (not shown), and then springably travels back out when the inward pressure is released, providing a tactile "click" along with a corresponding audible clicking sound. Thus, for the embodiment of FIGS. 5A-5B, an inward click can be achieved by direct pressing on the outer rotatable ring 512 itself, or by indirect pressing of the outer rotatable ring 512 by virtue of providing inward pressure on the cover 514, the lens 510, or by various combinations thereof. For other embodiments, the thermostat 102 can be mechanically configured such that only the outer ring 512 travels inwardly for the inward click input, while the cover 514 and lens 510 remain motionless.

FIG. 5B illustrates a right side elevation view of the thermostat 102. According to some embodiments, the thermostat 102 includes a processing system 560, display driver 564 and a wireless communications system 566. The processing system 560 is adapted to cause the display driver 564 and display 516 to display information to the user, and to receive user input via the outer rotatable ring 512. The processing system 560, according to some embodiments, is capable of carrying out the governance of the operation of thermostat 102 including various user interface features. The processing system 560 is further programmed and configured to carry out other operations, such as maintaining and updating a thermodynamic model for the enclosure in which the HVAC system is installed. According to some embodiments, a wireless communications system 566 is used to communicate with devices such as personal computers, other thermostats or HVAC system components, smart phones, local home wireless networks, routers, gateways, home appliances, security systems, hazard detectors, remote thermostat management servers, distributed sensors and/or sensor systems, and other components it the modern smarthome environment. Such communications may include peer-to-peer communications, communications through one or more servers located on a private network, or and/or communications through a cloud-based service.

According to some embodiments, the thermostat 102 includes a head unit 540 and a backplate (or wall dock) 542. Head unit 540 of thermostat 102 is slidably mountable onto back plate 542 and slidably detachable therefrom. According to some embodiments the connection of the head unit 540 to backplate 542 can be accomplished using magnets, bayonet, latches and catches, tabs, and/or ribs with matching indentations, or simply friction on mating portions of the head unit 540 and backplate 542. Also shown in FIG. 5A is a rechargeable battery 522 that is recharged using recharging circuitry 524 that uses power from backplate that is either obtained via power harvesting (also referred to as power stealing and/or power sharing) from the HVAC system control circuit (s) or from a common wire, if available. According to some embodiments, the rechargeable battery 522 may include a single cell lithium-ion battery, or a lithium-polymer battery.

FIGS. 6A-6D illustrate exploded front and rear perspective views, respectively, of the thermostat 102 with respect to its two main components, which are the head unit 540 and the backplate 542. In the drawings shown herein, the "z" direction is outward from the wall, the "y" direction is the toe-to-head direction relative to a walk-up user, and the "x" direction is the user's left-to-right direction.

Figure 6B:
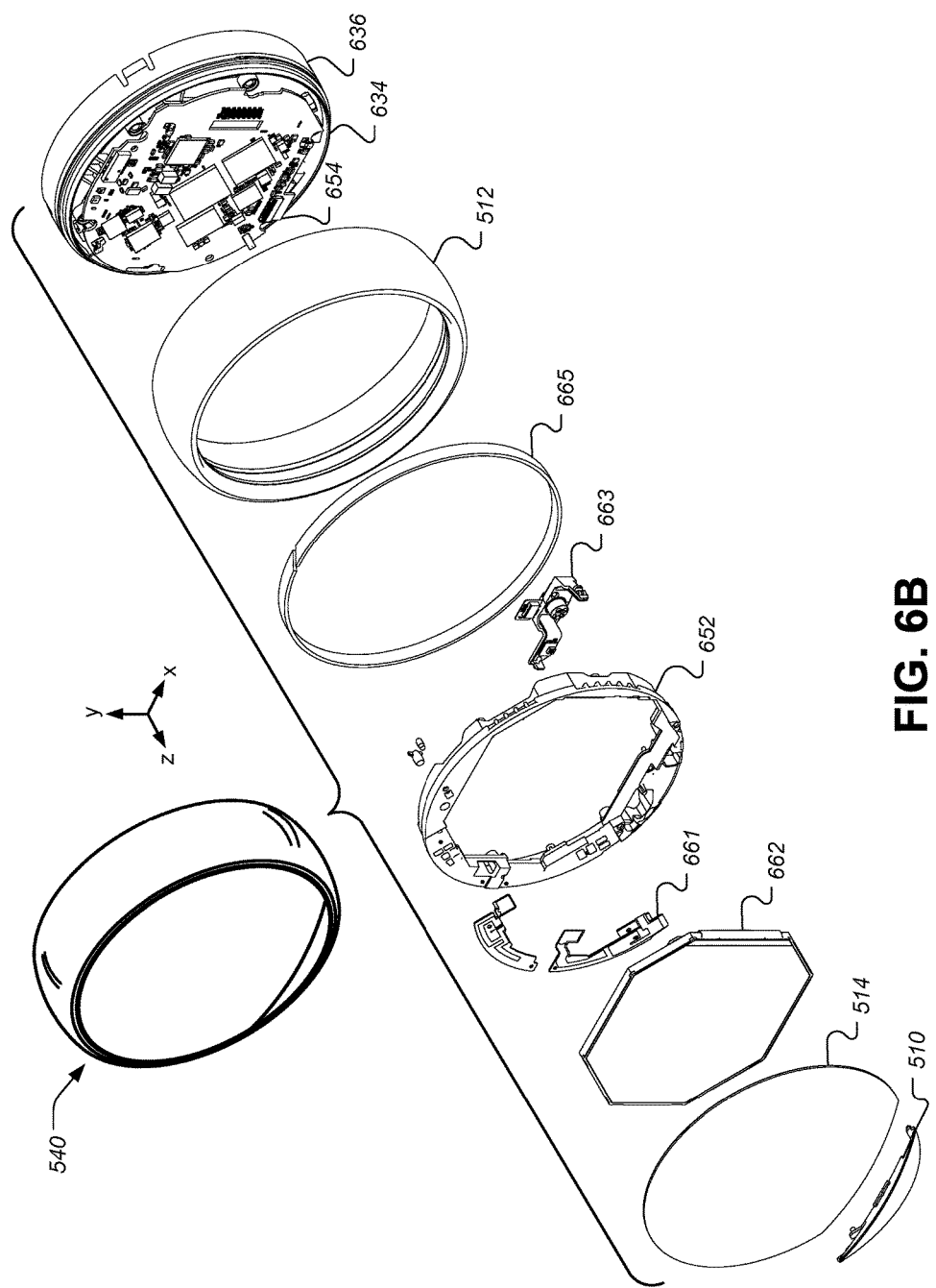
FIG. 6B illustrates an exploded front perspective view of a head unit display assembly with respect to its primary components, according to some embodiments.

FIG. 6A illustrates an exploded front perspective view of the head unit 540 with respect to its primary components. Head unit 540 includes, a back cover 636, a bottom frame 634, a battery assembly 632 with the rechargeable battery 522, a head unit printed circuit board (PCB) 654, the outer rotatable ring 512, the cover 514, and the lens 510. Behind the lens is the display assembly 630, which will be described in relation to FIG. 6B below. Electrical components on the head unit PCB 654 can connect to electrical components on the back plate 542 by virtue of a plug-type electrical connector on the back cover 636. The head unit PCB 654 is secured to head unit back cover 636 and display assembly 630. The outer rotatable ring 512 is held between a bearing surface on the display assembly 630 and bearing surfaces on the bottom frame 634. Motion of the outer rotatable ring 512 in the z direction is constrained by flat bearing surfaces on the display assembly 630 and bottom frame 634, while motion of the ring in x and y directions are constrained at least in part by circular rounded surfaces on the bottom frame 634. According to some embodiments, the bearing surfaces of the bottom frame 634 and/or the display assembly 630 are greased and/or otherwise lubricated to both smooth and dampen rotational movement for the outer ring 512. The head unit printed PCB 654 may include some or all of processing system 560, display driver 564, wireless communication system 566, and battery recharging circuitry 524 as shown and described with respect to FIG. 5A, as well as one or more additional memory storage components. According to some embodiments, circuitry and components are mounted on both sides of head unit PCB 654. Although not shown, according to some embodiments, shielding can surround circuitry and components on both sides of the head unit PCB 654.

Battery assembly 632 includes a rechargeable battery 522. Battery assembly 632 also includes connecting wires 666, and a battery mounting film that is attached to battery 522 using a strong adhesive and/or the any rear shielding of head unit PCB 654 using a relatively weaker adhesive. According to some embodiments, the battery assembly 632 is user-replaceable.

FIG. 6B illustrates an exploded front perspective view of the head unit 540 with an exploded view of the display assembly 630. The display assembly 630 comprises the cover 514, the lens 510, an LCD module 662, a pair of RF antennas 661, a head unit top frame 652, a sensor flex assembly 663, and a magnetic ring 665. The sensor flex assembly 663 connects to the head unit PCB 654 using a connector on a flexible PCB. The sensor flex assembly 663 also includes the PIR sensor 550 and the near-field proximity sensor 552. Additionally, the sensor flex assembly 663 may include a temperature sensor IC that is positioned close to the lens 515 so as to accurately measure temperature outside of the thermostat 102 without being overly affected by internal heating of thermostat components. The sensor flex assembly 663 may be comprised of these three sensors, along with a flexible PCB (including the connector for the head unit PCB 654) and a plastic bracket to which the sensors and flexible PCB are mounted. The bracket ensures that the sensor flex assembly 663 is positioned and oriented consistently and correctly with respect to the lens 510. The lens 510 includes two sections that are thinned to approximately 0.3 mm in front of the near-field proximity sensor 552 and the temperature sensor. The lens 510 also includes a section with a Fresnel lens pattern in front of the PIR sensor 550. In some embodiments, additional temperature sensors may be placed throughout the thermostat 102, such as a temperature sensor on the head unit PCB 654 and a temperature sensor on the back plate PCB 680.

The head unit PCB 554 includes a Hall effect sensor that senses rotation of the magnetic ring 665. The magnetic ring 665 is mounted to the inside of the outer rotatable ring 512 using an adhesive such that the outer rotatable ring 512 and the magnetic ring 665 are rotated together. The magnetic ring 665 includes striated sections of alternating magnetic polarity that are diagonally positioned around the magnetic ring 665. The Hall effect sensor senses the alternations between magnetic polarities as the outer ring 512 is rotated. The Hall effect sensor can be controlled by a primary processor, which is a higher powered processor, without excessive power drain implications because the primary processor will invariably be awake already when the user is manually turning the outer rotatable ring 512 to control the user interface. Advantageously, very fast response times can also be provided by the primary processor.

The antennas 661 are mounted to the top surface of the head unit top frame 652. The wireless communications system 566 may include Wi-Fi radios of various frequencies (e.g., 2.4 GHz and 5.0 GHz), along with an IEEE 802.15.4-compliant radio unit for a local-area smart home device network that may include other thermostats, hazard detectors, security system modules, and so forth. The IEEE 802.15.4 unit may use the Thread protocol for achieving such communications. In some embodiments, the wireless communications system 566 may also include a Bluetooth low energy (BLE) radio for communication with user devices.

The processing system 560 may be primarily located on the head unit PCB 654 and may include a primary processor and a secondary processor. The primary processor may be a comparatively high-powered processor, such as the AM3703 chip, or the MCIMX6X3EVK10AB chip from Freescale™, and may be programmed to perform sophisticated thermostat operations, such as time-to-temperature calculations, occupancy determination algorithms, ambient temperature compensation calculations, software updates, wireless transmissions, operation of the display driver 564, and regulation of the recharging circuitry 524. The secondary processor, such as the STM32L chip from ST microelectronics, may be a comparatively low-power processor when compared to the primary processor. The secondary processor may interact with the HVAC system to control a series of FET switches that control the functioning of the HVAC system. The secondary processor may also interface with various sensors in thermostat 102, such as the temperature sensors, a humidity sensor, an ambient light sensor, and/or the like. The secondary processor may also share duties with the primary processor in regulating the recharging circuitry 522 to provide power to all of the electrical systems on board the thermostat 102. Generally, the primary processor will operate in a "sleep" mode until high-power processing operations (e.g., wireless communications, user interface interactions, time-to-temperature calculations, thermal model calculations, etc.) are required, while the secondary processor will operate in an "awake" mode more often than the primary processor in order to monitor environmental sensors and wake the primary processor when needed.

FIGS. 6C-6D illustrate exploded front and rear perspective views, respectively, of the back plate unit 542 with respect to its primary components, according to some embodiments. Back plate unit 542 comprises a back plate rear plate 682, a back plate PCB 680, and a back plate cover 670. Visible in FIG. 6C are the HVAC wire connectors 684 that include integrated mechanical wire insertion sensing circuitry, and relatively large capacitors 686 that are used by part of the power stealing circuitry that is mounted on the back plate PCB 680. According to some embodiments, backplate 542 includes electronics and a temperature/humidity sensor in housing. Wire connectors 684 are provided to allow for connection to HVAC system wires, which pass though the large central circular opening 690, which is visible in each of the backplate primary components. Also visible in each of the backplate primary components are two mounting holes 692 and 694 for use in fixing the backplate to the wall. Also visible in FIGS. 6C-6D are a bubble level 672 to allow the user to install the thermostat 102 in a level position without additional tools.

The back plate PCB 680 also may include approximately seven custom power isolation ICs 685 that isolate the internal electronics of the thermostat 102 from the relatively high 24 VAC signals of the HVAC system. The power isolation ICs 685 are custom software-resettable fuses that both monitor transient and anomalous voltage/current signals on the HVAC power/return wires and switch off the connection to isolate the thermostat against any dangerous signals that could damage the internal electronics. The power isolation ICs 685 receive command signals encoded in a clock square wave from the processing system 560 to open and close a pair of power FETs for each HVAC return wire in order to activate the corresponding HVAC function (e.g., fan, air-conditioning, heat, heat pump, etc.).

Figure 7:
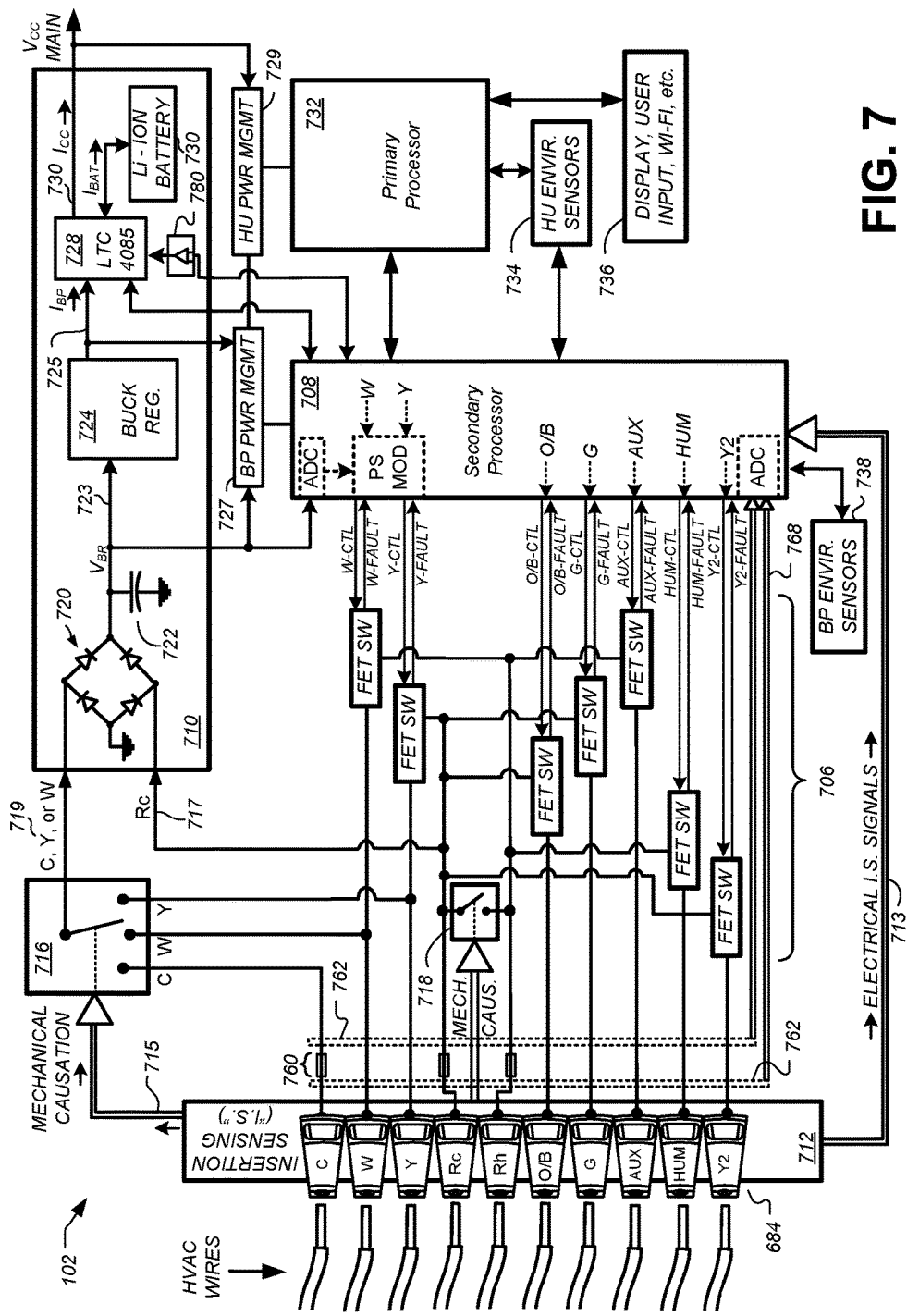
FIG. 7 illustrates a block diagram illustrating circuitry within a thermostat, according to some embodiments.

FIG. 7 illustrates a power management and power harvesting system for a smart thermostat, according to some embodiments. FIG. 7 shows connections to common HVAC wiring, such as a W (heat call relay wire); Y (cooling call relay wire); Y2 (second stage cooling call relay wire); Rh (heat call relay power); Rc (cooling call relay power); G (fan call relay wire); O/B (heat pump call relay wire); AUX (auxiliary call relay wire); HUM (humidifier call relay wire); and C (common wire). As discussed above, the thermostat 102 comprises a plurality of FET switches 706 (such as the power isolation ICs 685 of FIG. 6D above) used for carrying out the essential thermostat operations of connecting or "shorting" one or more selected pairs of HVAC wires together according to the desired HVAC operation. The operation of each of the FET switches 706 is controlled by the secondary processor 708 which can comprise, for example, an STM32L 32-bit ultra-low power ARM-based microprocessor available from ST Microelectronics.

Thermostat 102 further comprises powering circuitry 710 that comprises components contained on both the backplate 542 and head unit 540. Generally speaking, it is the purpose of powering circuitry 710 to extract electrical operating power from the HVAC wires and convert that power into a usable form for the many electrically-driven components of the thermostat 102. Thermostat 102 further comprises insertion sensing components 712 configured to provide automated mechanical and electrical sensing regarding the HVAC wires that are inserted into the thermostat 102. Thermostat 102 further comprises a relatively high-power primary processor 732, such as an AM3703 Sitara ARM microprocessor available from Texas Instruments, that provides the main general governance of the operation of the thermostat 102. Thermostat 102 further comprises environmental sensors 734/738 (e.g., temperature sensors, humidity sensors, active IR motion sensors, passive IR motion sensors, multi-channel thermopiles, ambient visible light sensors, accelerometers, ambient sound sensors, ultrasonic/infrasonic sound sensors, microwave sensors, GPS sensors, etc.), as well as other components 736 (e.g., electronic display devices and circuitry, user interface devices and circuitry, wired communications circuitry, wireless communications circuitry, etc.) that are operatively coupled to the primary processor 732 and/or secondary processor 708 and collectively configured to provide the functionalities described in the instant disclosure.

The insertion sensing components 712 include a plurality of HVAC wiring connectors 684, each containing an internal springable mechanical assembly that, responsive to the mechanical insertion of a physical wire thereinto, will mechanically cause an opening or closing of one or more dedicated electrical switches associated therewith. With respect to the HVAC wiring connectors 684 that are dedicated to the C, W, Y, Rc, and Rh terminals, those dedicated electrical switches are, in turn, networked together in a manner that yields the results that are illustrated in FIG. 7 by the blocks 716 and 718. The output of block 716, which is provided at a node 719, is dictated solely by virtue of the particular combination of C, W, and Y connectors into which wires have been mechanically inserted in accordance with the following rules: if a wire is inserted into the C connector, then the node 719 becomes the C node regardless of whether there are any wires inserted into the Y or W connectors; if no wire is inserted into the C connector and a wire is inserted into the Y connector, then the node 719 becomes the Y node regardless of whether there is a wire inserted into the W connector; and if no wire is inserted into either of the C or Y connectors, then the node 719 becomes the W node. Block 718 is shown as being coupled to the internal sensing components 712 by virtue of double lines termed "mechanical causation," for the purpose of denoting that its operation, which is either to short the Rc and Rh nodes together or not to short the Rc and Rh nodes together. Whether the block 718 will short, or not short, the Rc and Rh nodes together is dictated solely by virtue of the particular combination of Rc and Rh connectors into which wires have been mechanically inserted. Block 718 will keep the Rc and Rh nodes shorted together, unless wires have been inserted into both the Rc and Rh connectors, in which case the block 718 will not short the Rc and Rh nodes together because a two-HVAC-transformer system is present. The insertion sensing circuitry 712 is also configured to provide at least two signals to the secondary processor 708, the first being a simple "open" or "short" signal that corresponds to the mechanical insertion of a wire, and the second being a voltage or other level signal that represents a sensed electrical signal at that terminal. The first and second electrical signals for each of the respective wiring terminals can advantageously be used as a basis for basic "sanity checking" to help detect and avoid erroneous wiring conditions.

Basic operation of each of the FET switches 706 is achieved by virtue of a respective control signal (e.g., W-CTL, Y-CTL) provided by the secondary processor 708 that causes the corresponding FET switch 706 to "connect" or "short" its respective HVAC lead inputs for an ON control signal, and that causes the corresponding FET switch 706 to "disconnect" or "leave open" or "open up" its respective HVAC lead inputs for an "OFF" control signal. By virtue of the above-described operation of block 718, it is automatically the case that for single-transformer systems having only an "R" wire (rather than separate Rc and Rh wires as would be present for two-transformer systems), that "R" wire can be inserted into either of the Rc or Rh terminals, and the Rh-Rc nodes will be automatically shorted to form a single "R" node, as needed for proper operation. In contrast, for dual-transformer systems, the insertion of two separate wires into the respective Rc and Rh terminals will cause the Rh-Rc nodes to remain disconnected to maintain two separate Rc and Rh nodes, as needed for proper operation.

Referring now to the powering circuitry 710 in FIG. 7, provided is a configuration that automatically adapts to the powering situation presented to the thermostat 102 at the time of installation and thereafter. The powering circuitry 710 comprises a full-wave bridge rectifier 720, a storage and waveform-smoothing bridge output capacitor 722 (which can be, for example, on the order of 30 microfarads), a buck regulator circuit system 724, a power-and-battery (PAB) regulation circuit 728, and a rechargeable lithium-ion battery 730. In conjunction with other control circuitry including backplate power management circuitry 727, head unit power management circuitry 729, and the secondary processor 708, the powering circuitry 710 is configured and adapted to have the characteristics and functionality described hereinbelow.

By virtue of the configuration illustrated in FIG. 7, when there is a "C" wire presented upon installation, the powering circuitry 710 operates as a relatively high-powered, rechargeable-battery-assisted AC-to-DC converting power supply. When there is not a "C" wire presented, the powering circuitry 710 operates as a power-stealing, rechargeable-battery-assisted AC-to-DC converting power supply. As illustrated in FIG. 7, the powering circuitry 710 generally serves to provide the voltage Vcc MAIN that is used by the various electrical components of the thermostat 102, and that in one embodiment will usually be about 3.7V~3.95V. The general purpose of powering circuitry 710 is to convert the 24 VAC presented between the input leads 719 and 717 to a steady DC voltage output at the Vcc MAIN node to supply the thermostat electrical power load.

Operation of the powering circuitry 710 for the case in which the "C" wire is present is now described. When the 24VAC input voltage between nodes 719 and 717 is rectified by the full-wave bridge rectifier 720, a DC voltage at node 723 is present across the bridge output capacitor 722, and this DC voltage is converted by the buck regulator system 724 to a relatively steady voltage, such as 4.4 volts, at node 725, which provides an input current $I_{BP}$ to the power-and-battery (PAB) regulation circuit 728.

The secondary processor 708 controls the operation of the powering circuitry 710 at least by virtue of control leads leading between the secondary processor 708 and the PAB regulation circuit 728, which for one embodiment can include an LTC4085-4 chip available from Linear Technologies Corporation. The LTC4085-4 is a USB power manager and Li-Ion/Polymer battery charger originally designed for portable battery-powered applications. The PAB regulation circuit 728 provides the ability for the secondary processor 708 to specify a maximum value $I_{Bp}(max)$ for the input current $I_{BP}$. The PAB regulation circuit 728 is configured to keep the input current at or below $I_{BP}(max)$, while also providing a steady output voltage Vcc, such as 4.0 volts, while also providing an output current Icc that is sufficient to satisfy the thermostat electrical power load, while also tending to the charging of the rechargeable battery 730 as needed when excess power is available, and while also tending to the proper discharging of the rechargeable battery 730 as needed when additional power (beyond what can be provided at the maximum input current $I_{BP}$ (max)) is needed to satisfy the thermostat electrical power load.

Operation of the powering circuitry 710 for the case in which the "C" wire is not present is now described. As used herein, "inactive power stealing" refers to the power stealing that is performed during periods in which there is no active call in place based on the lead from which power is being stolen. As used herein, "active power stealing" refers to the power stealing that is performed during periods in which there is an active call in place based on the lead from which power is being stolen.

During inactive power stealing, power is stolen from between, for example, the "Y" wire that appears at node 719 and the Rc lead that appears at node 717. There will be a 24VAC HVAC transformer voltage present across nodes 719/717 when no cooling call is in place (i.e., when the Y-Rc FET switch is open). For one embodiment, the maximum current $I_{BP}$ (max) is set to a relatively modest value, such as 20 mA, for the case of inactive power stealing. Assuming a voltage of about 4.4 volts at node 725, this corresponds to a maximum output power from the buck regulator system 724 of about 88 mW. This power level of 88 mW has been found to not accidentally trip the HVAC system into an "on" state due to the current following through the call relay coil. During this time period, the PAB regulator 728 operates to discharge the battery 730 during any periods of operation in which the instantaneous thermostat electrical power load rises above 88 mW, and to recharge the battery (if needed) when the instantaneous thermostat electrical power load drops below 88 mW. The thermostat 700 is configured such that the average power consumption is well below 88 mW, and indeed for some embodiments is even below 10 mW on a long-term time average.

Operation of the powering circuitry 710 for "active power stealing" is now described. During an active heating/cooling call, it is necessary for current to be flowing through the HVAC call relay coil sufficient to maintain the HVAC call relay in a "tripped" or ON state at all times during the active heating/cooling call. The secondary processor 708 is configured by virtue of circuitry denoted "PS MOD" to turn, for example, the Y-Rc FET switch OFF for small periods of time during the active cooling call, wherein the periods of time are small enough such that the cooling call relay does not "un-trip" into an OFF state, but wherein the periods of time are long enough to allow inrush of current into the bridge rectifier 720 to keep the bridge output capacitor 722 to a reasonably acceptable operating level. For one embodiment, this is achieved in a closed-loop fashion in which the secondary processor 708 monitors the voltage $V_{BR}$ at node 723 and actuates the signal Y-CTL as necessary to keep the bridge output capacitor 722 charged. According to one embodiment, it has been found advantageous to introduce a delay period, such as 60-90 seconds, following the instantiation of an active heating/cooling cycle before instantiating the active power stealing process. This delay period has been found useful in allowing many real-world HVAC systems to reach a kind of "quiescent" operating state in which they will be much less likely to accidentally un-trip away from the active cooling cycle due to active power stealing operation of the thermostat 102. According to another embodiment, it has been found further advantageous to introduce another delay period, such as 60-90 seconds, following the termination of an active cooling cycle before instantiating the inactive power stealing process. This delay period has likewise been found useful in allowing the various HVAC systems to reach a quiescent state in which accidental tripping back into an active cooling cycle is avoided.

Efficient Operation at Low Temperatures

Embodiments discussed herein generally relate to techniques for enrolling customers in demand response (DR) programs that can be used not only in warm-weather months, but also in cold-weather months. The intelligent thermostat described above is capable of receiving demand response events from the thermostat management server and altering a setpoint schedule in order to shift HVAC energy usage outside of a defined demand response interval. The thermostat management server provides an Application Programming Interface (API) for receiving demand response event definitions and enrollment information from an energy provider, and transmitting such information to the intelligent thermostat. The entities in a system for managing demand programs and events may include a utility provider that provides electrical or other forms of energy from a power source (e.g., an electrical generator) to individual homes or businesses. In some embodiments a thermostat management server is disposed between a utility provider computer system and a plurality of structures. The thermostat management server operates to intelligently and effectively control individual thermostats in the structures to modify HVAC energy consumption during a demand response event. During cold-weather months when the HVAC system will be heating the home, such modifications may include preheating a home before a demand response interval, increasing maintenance bands around a setpoint temperature, increasing a setback temperature when the home is unoccupied and/or the occupants are asleep, and/or minimizing the use of auxiliary heating stages that are generally more costly.

The thermostat management server according to many embodiments interfaces with an intelligent, network-connected thermostat installed in each structure, such as the thermostat described above in relation to FIGS. 5-7. Such a thermostat can acquire information about the residence, a likelihood of the residence being occupied (via occupancy sensors that, over time, can build an occupancy probability profile), a weather forecast, a real-time weather status, a real-time occupancy, etc. Moreover, the thermostat can be programmed by its users or may learn, over time, the preferences and habits of its users to set scheduled setpoints that include a target temperature and a time. In some embodiments, a population of such network-connected thermostats associated with a respective population of individual structures may be configured to communicate with the thermostat management server. Each network-connected thermostat may be associated with one or more accounts managed by the thermostat management server, and data may be sent back and forth as needed between each network-connected thermostat and the thermostat management server for providing a variety of advantageous functionalities, such as facilitating remote control, reporting weather data, reporting HVAC control data and status information, and/or providing the centralized and/or partially centralized control and data communications required to carry out DR-related functionalities described herein.

It is to be appreciated that some embodiments herein may be particularly suitable and advantageous for commercial scenarios in which the thermostat management server associated with the population of network-connected thermostats is a separate and distinct business entity from the utilities providers themselves.

Figure 8:
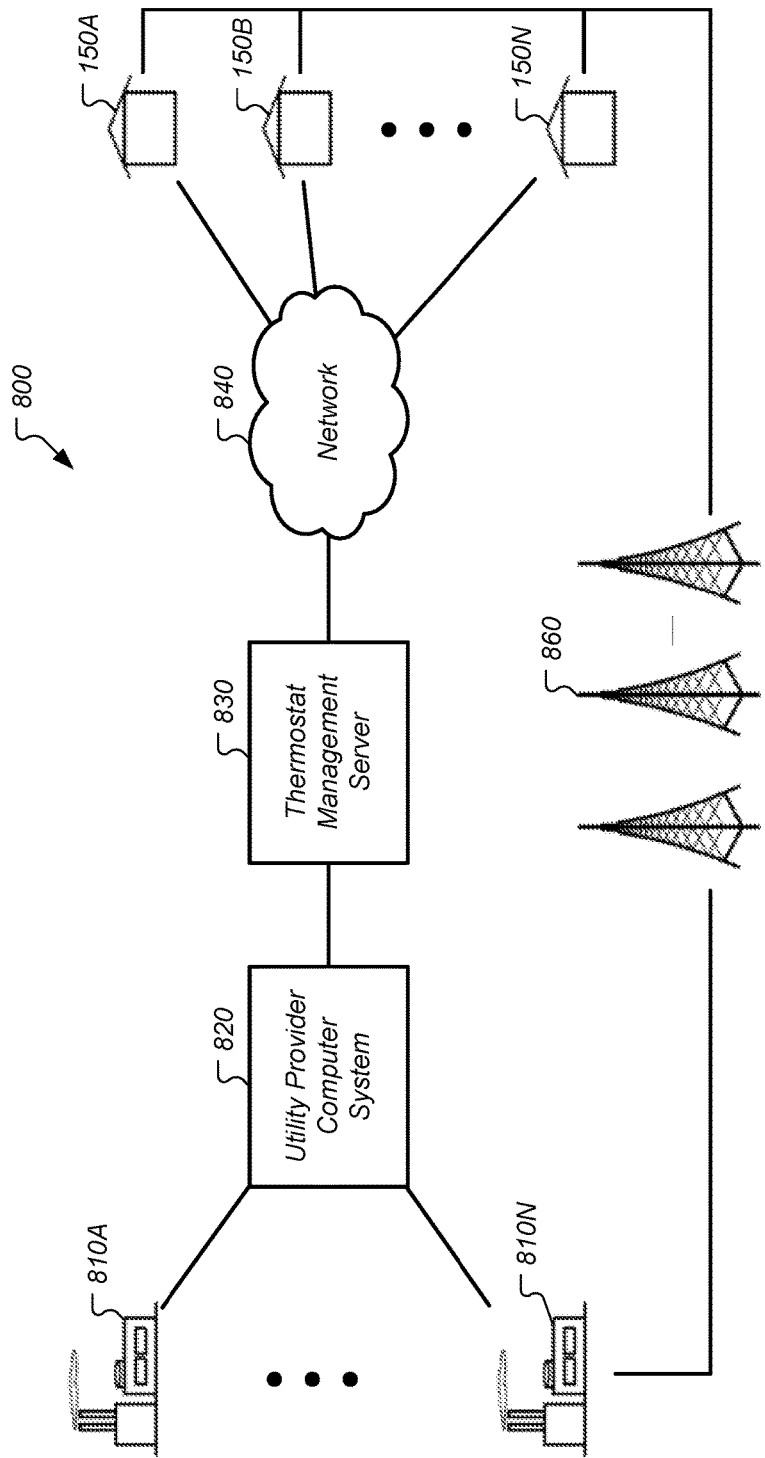
FIG. 8 depicts a system for managing peak demand programs and events according to some embodiments.

FIG. 8 depicts a system 800 for managing peak demand programs and events according to some embodiments. System 800 includes a plurality of electrical power generators 810A-810N, a utility provider computing system 820, a thermostat management server 830, a communication network 840, a plurality of energy consumer structures 150A-150N, and a power distribution network 860.

Electrical power generators 810 are operable to generate electricity or other type of energy (e.g., natural gas) using one or more of a variety of techniques known in the art. For example, electrical power generators 810 may include hydroelectric systems, geothermal plants, nuclear power plants, fossil-fuel based power plants, solar plants, wind plants, gas processing plants, etc. The amount of electricity that may be generated at any given time may be limited to some maximum energy supplied that is determined by the generators 810. Further, the electrical power generators 810 may be owned and managed by a utility provider implementing the utility provider computing system 820, or may be owned and/or managed by one or more third party entities that contract with the utility provider to provide source energy to customers of the utility provider.

Utility provider computer system 820 may include a computing system operable to communicate with one or more of the electrical power generators 810A-810N and the thermostat management server 830. The utility provider associated with the utility provider computer system 820 typically manages the distribution of electricity from the electrical power generators 810A-810N to energy consumers at the structures 150A-150N. This management includes ensuring the electricity is successfully communicated from the power generators 810A-810N to the structures 150A-150N, monitoring the amount of energy consumption at each of the structures 150A-150N, and collecting fees from occupants of the structures 150A-150N in accordance with the their respective monitored amount of energy consumption. The utility provider computer system 820 may perform one or more of the operations described herein, and may include a variety of computer processors, storage elements, communication mechanisms, etc. as further described herein and as necessary to facilitate the described operations.

Thermostat management server 830 may include a computing system operable to intelligently and efficiently manage the HVAC energy consumption at one or more of the structures 150A-150N while optionally providing reporting and control mechanisms to the utility provider computing system 820. The thermostat management server 830 may be operable to engage in real-time two-way communications with thermostat devices associated with the structures 150A-150N via the network 840, as well as engage in real-time two-way communications with the utility provider computer system 820. The thermostat management server 830 may perform one or more of the operations described herein, and may include a variety of computer processors, storage elements, communication mechanisms, etc. as further described herein and as necessary to facilitate the described operations. Specifically, the thermostat management server 830 may include a plurality of servers, databases, and/or cloud platform/services, distributed across various locations.

Network 840 may include any suitable network for enabling communications between various entities, such as between one or more components of the thermostat management server 830 and one or more electronic devices associated with one or more of the structures 150A-150N. Such a network may include, for example, a local area network, a wide-area network, a virtual private network, the Internet, an intranet, an extranet, a public switched telephone network, an infrared network, a wireless network, a wireless data network, a cellular network, or any other such wired or wireless network(s) or combination(s) thereof. The network 840 may, furthermore, incorporate any suitable network topology. Network 840 may utilize any suitable protocol, and communication over the network 840 may be enabled by wired or wireless connections, and any combinations thereof.

Structures 150A-150N may include a variety of structures or enclosures that are associated with HVAC energy consumption. The structures may span a variety of structural types, such as private residences, houses, apartments, condominiums, schools, commercial properties, single or multi-level office buildings, and/or manufacturing facilities. A number of examples described herein refer to the structure as being a private residence in the form of a house, but embodiments are not so limited as one skilled in the art would understand that the techniques described herein could equally be applicable to other types of structures. It is to be appreciated that, while some embodiments may be particularly advantageous for residential living scenarios, the scope of the present teachings is not so limited and may equally be advantageous for business environments, school environments, government building environments, sports or entertainment arenas, and so forth. Thus, while many of the descriptions below are set forth in a residential living context, it is to be appreciated that this is for purposes of clarity of description and not by way of limitation.

The structures 150A-150N typically include one or more energy consumption devices, which could be electrical energy consumption devices such as televisions, microwaves, home audio equipment, heating/cooling systems, laundry machines, dishwashers, etc. Similarly, energy consumption devices could include one or more other types of energy consumption devices such as gas consumption devices. For example, the structures 150A-150N may include a natural gas (air/water/etc.) heater, stove, fireplace, etc. The structures 150A-150N in many embodiments include an intelligent, network connected thermostat that is operable to control the thermal environment of the residence. For some embodiments, some or all of the intelligent, network-connected thermostats may be the same as or similar in functionality to the NEST LEARNING THERMOSTAT® available from Google, Inc. of Palo Alto, Calif.

Power distribution network 860 may include any suitable network for transferring energy from one or more of the electrical power generators 810A-810N to one or more of the structures 150A-150N. In an electrical distribution network, power distribution network 860 may include a variety of power lines, substations, pole-mounted transformers, and the like as known in the art for carrying electricity from the electrical power generators 810A-810N to the structures 150A-150N. In a gas distribution network, power distribution network 860 may include a variety of compressor stations, storage elements, pipes, and/or the like for transporting natural or other types of energy producing gas from the power generators 810A-810N (in this embodiment, gas wells and/or processing plants) to the structures 150A-150N.

System 800 in certain embodiments may be a distributed system utilizing several computer systems and components that are interconnected via communication links using one or more computer networks or direct connections. However, it will be appreciated by those skilled in the art that such a system could operate equally well in a system having fewer or a greater number of components than are illustrated in FIG. 8. Thus, the depiction of system 800 in FIG. 8 should be taken as being illustrative in nature, and not as limiting the scope of the present embodiments.

Energy providers face variable rates for energy during different yearly seasons and even throughout the hours of a single day. Energy rates for utility providers to purchase energy from the electrical power generators 810A-810N are often low in the morning and late at night, and then climb during peak-power usage hours in the late afternoon as customers run their air conditioners more extensively during summer months. However, in order to shift energy usage out of these high cost intervals, utility companies may issue demand response events that offer incentives to thermostat users who are able to shift their HVAC energy usage outside of the demand response interval. During summer months, this involves precooling a house using an air conditioner prior to the demand response interval, then limiting the use of the air conditioner during the demand response interval.

Issuing demand response events during winter months presents a functionally different problem from demand response events in summer months. During cold weather situations, the HVAC system will be heating the home instead of cooling the home. Instead of using electricity to power the compressor of an air conditioning system, the main HVAC fuel source is natural gas. This is significant because the natural gas market is generally a day-ahead market instead of a real-time market, which means that there is generally no real-time need for utility providers to reduce the instantaneous natural gas usage. However, in some geographic areas-mainly the southeast and the northwest of the United States-many homes still include HVAC heating elements that are powered by electricity rather the natural gas. For example, some homes use a heat pump that operates like an air conditioning compressor in reverse to transfer heat into the home. In some homes, electric strip heaters are mounted along the walls of the home about the floorboards and pass electrical currents through resistive heating elements to generate radiant heat. Some heat pumps may also include an auxiliary heat mode (also referred to herein as "AUX") that moves heat significantly faster than the regular heat pump mode at the cost of using significantly more electricity. As used herein, a heat pump operating in the normal mode may be referred to as operating in "stage 1," while a heat pump operating in an AUX mode may be referred to as operating in "stage 2." In areas that have a significant population of homes that rely on electricity for heat, demand response intervals can still be beneficial to utility providers.

Figure 9:
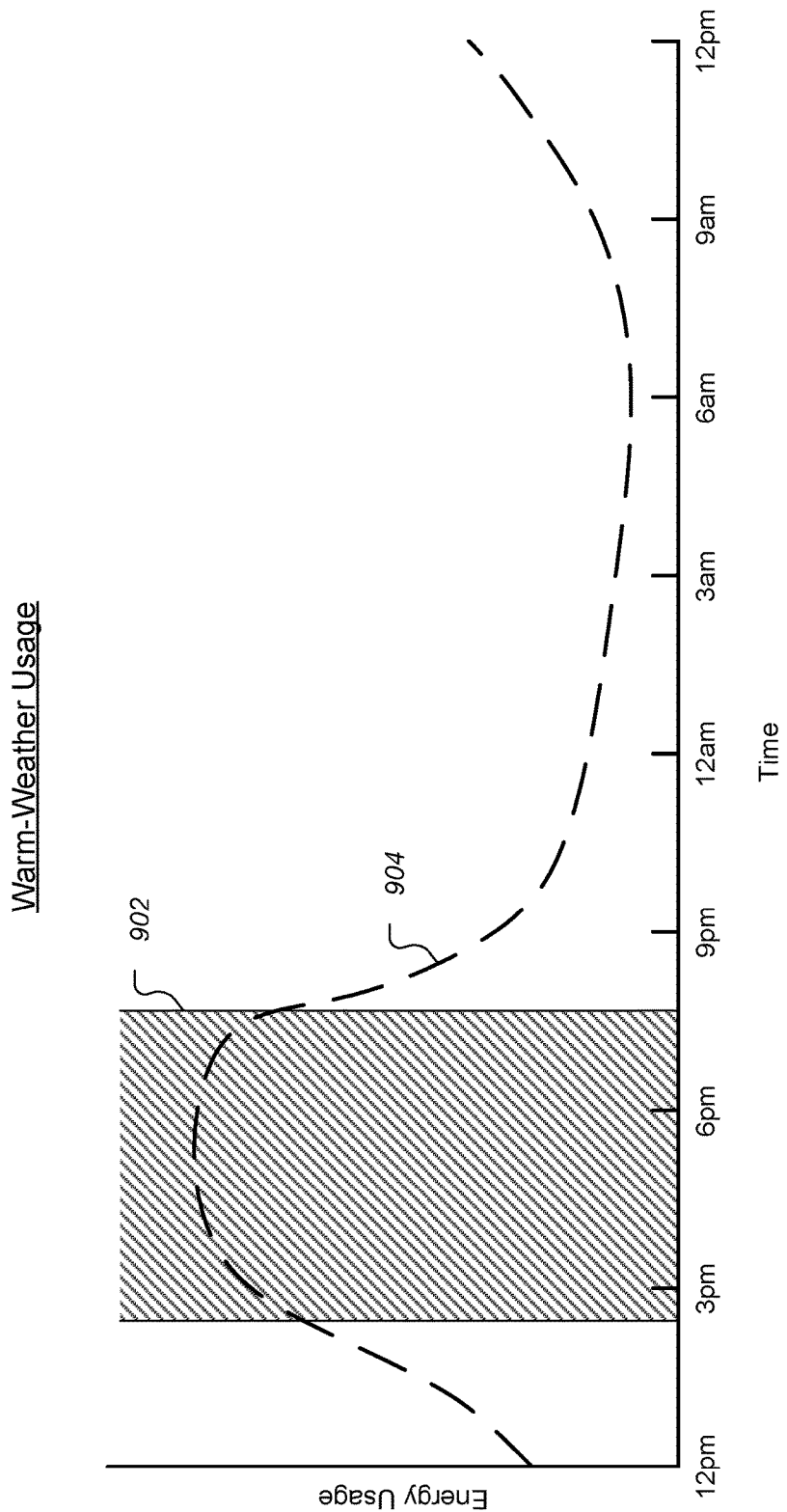
FIG. 9 illustrates a graph of energy usage during a 24 hour interval during warm-weather months.

Besides using different fuel sources and energy markets, demand response events during cold-weather months also present unique challenges in implementation. During warm-weather months, the high-energy-usage intervals generally occur in the afternoon when outdoor temperatures are at their peak. FIG. 9 illustrates a graph of energy usage 904 during a 24 hour interval during warm-weather months. A demand response interval 902 can be issued in the afternoon hours to coincide with the peak in energy usage on the electrical grid. Note that the hours of the demand response interval 902 may vary by energy market, geographic region, fuel source, and/or utility provider preference.

Figure 10:
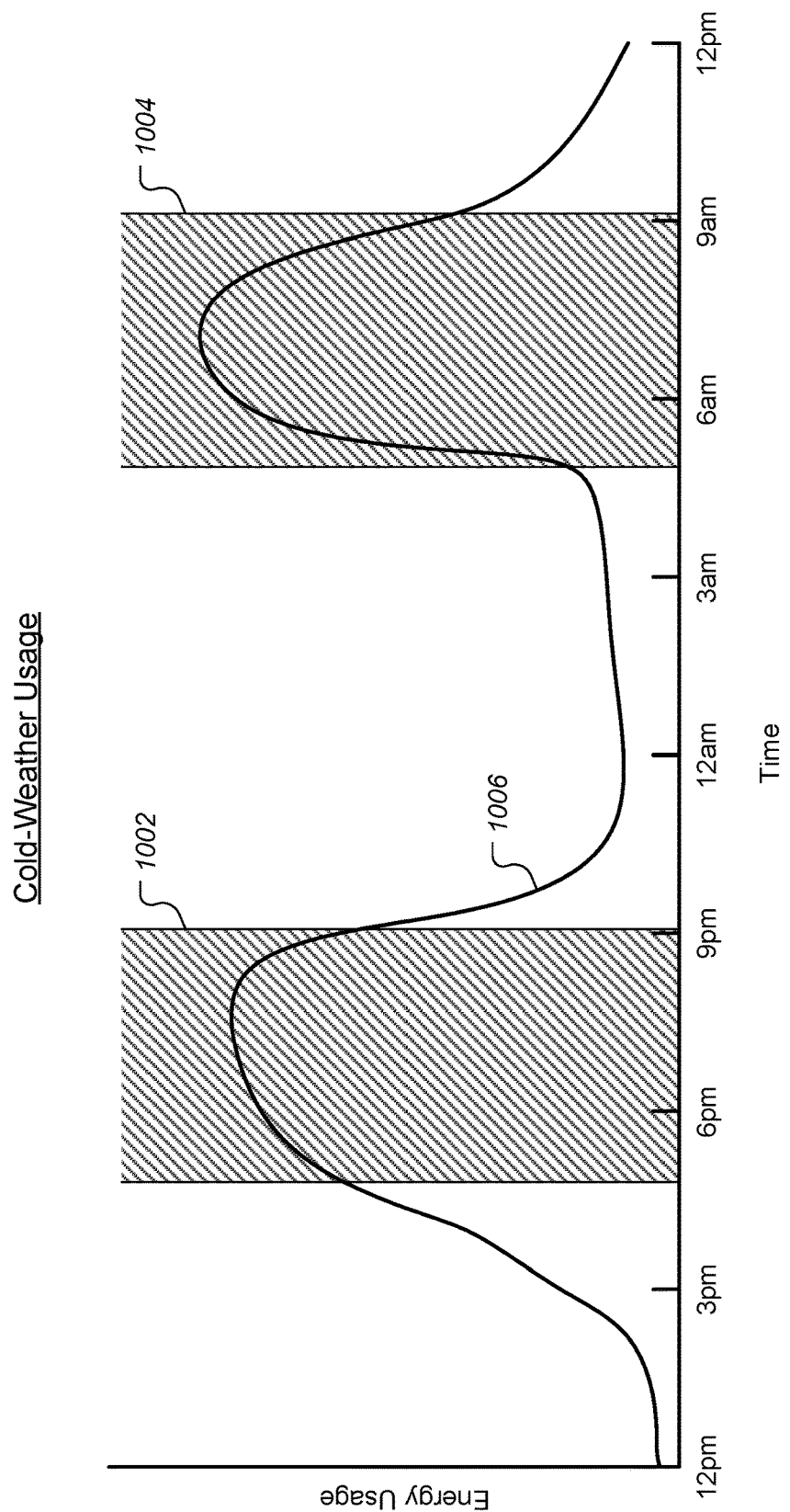
FIG. 10 illustrates a graph of energy usage during a 24 hour interval during cold-weather months.

In contrast, during cold-weather months, the high-energy-usage intervals generally occur first thing in the morning when occupants awake, and late in the evening when outdoor temperatures begin to fall and occupants arrive home from work/school. While precooling a home in the summer generally does not affect user comfort much, preheating a home during the night and/or early-morning hours can greatly affect user comfort by disrupting their sleep through a temperature increase and/or HVAC system noise. FIG. 10 illustrates a graph of energy usage 1006 during a 24 hour interval during cold-weather months. In contrast to the energy usage during warm-weather months, the energy usage 1006 in FIG. 10 is bimodal, with a first demand response interval 1002 occurring during early-morning hours, and a second demand response interval 1004 occurring during the evening hours. As with the demand response interval 902 in FIG. 9, the hours of the first and second demand response intervals 1002, 1004 may vary by energy market, geographic region, fuel source, and/or utility provider preference.

The embodiments described herein solve these and other problems by presenting an architecture and set of algorithms that can be used to respond to a real-time demand response event during cold-weather months. The utility provider can log into the same energy management portal provided by the thermostat management server to enroll customers and request a demand response event. However, the enrollment modified can be changed to require thermostats and HVAC systems that use electric heating (e.g., heat pumps, AUX). When the demand response event is received by the thermostat, the thermostat can determine how to best maintain a level of user comfort while still reducing electrical energy usage during the demand response interval.

Figure 11:
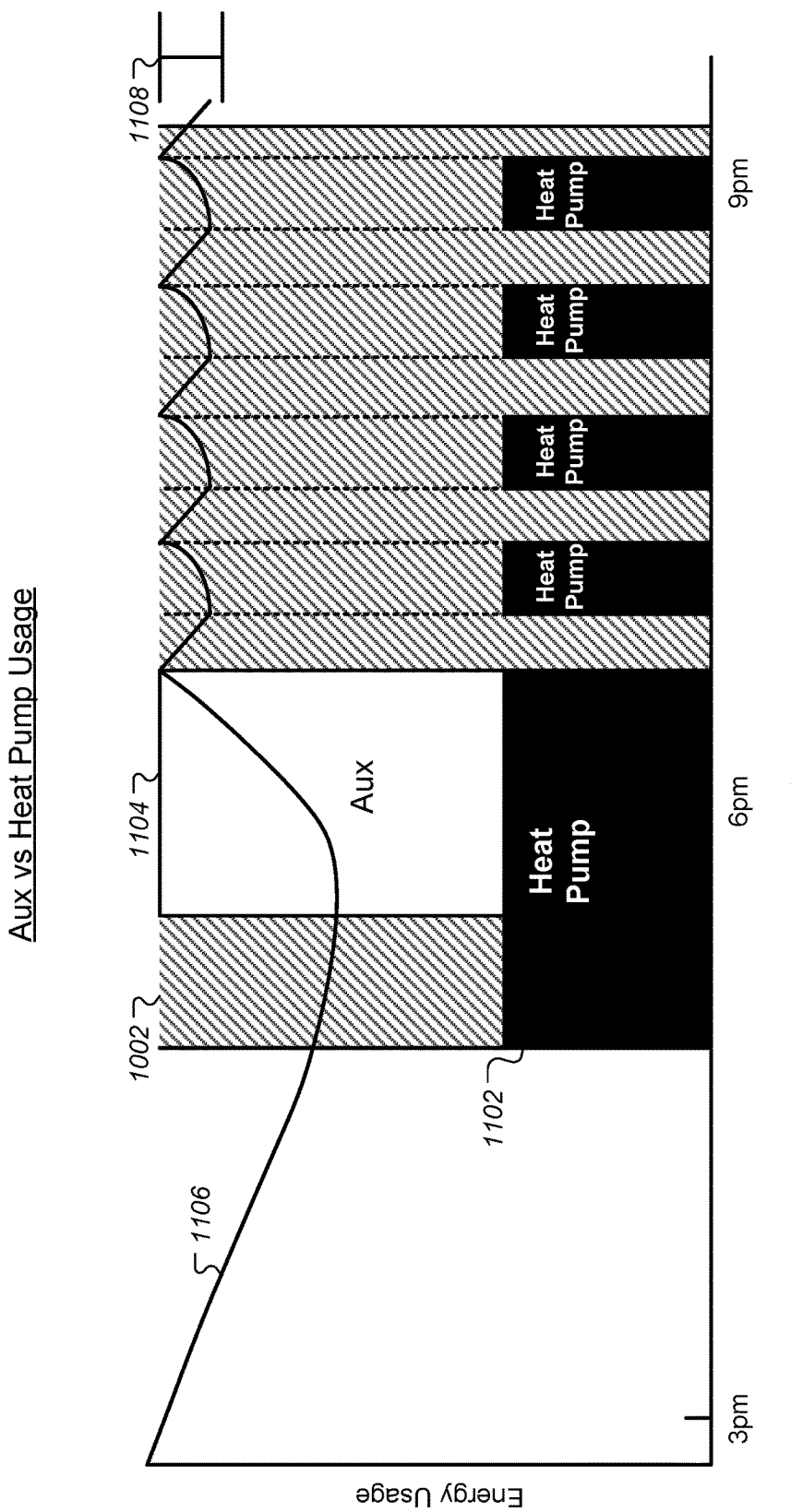
FIG. 11 illustrates a close-up view of the first demand response interval from FIG. 10.

One particularly effective way of reducing energy usage during a demand response interval is to minimize the use of the AUX stage of a heat pump. FIG. 11 illustrates a close-up view of the first demand response interval 1002 from FIG. 10. The indoor temperature 1106 begins to fall in the early afternoon hours. Around 5:00 PM when occupants generally arrive home, the user schedule of an intelligent thermostat will begin heating the home automatically. In some embodiments, the thermostat will initially activate stage I of the heat pump 1102. The thermostat described above will have previously determined the thermal characteristics of the home and the thermal capabilities of the HVAC system to determine how long the heat pump 1102 will take to reach a setpoint temperature in the user schedule. If the thermostat determines that the heat pump 1102 alone will heat the home slowly enough to affect user comfort, the thermostat may activate the AUX 1104 mode of the heat pump (stage II) to heat the house faster. Once the home is heated, the heat pump 1102 will turn on/off periodically to maintain the temperature 1106 setpoint temperature. The amount by which the temperature 1106 is allowed to vary from the setpoint temperature is referred to as a maintenance band 1108, or representation of thermal hysteresis.

In addition to the preconditioning or preheating described above, the embodiments described herein can alter the normal functioning of the thermostat and HVAC system during the first demand response interval 1002. First, a penalty can be added to the AUX 1104 mode of the HVAC system to reduce the number of times the AUX 1104 is activated. By reducing the frequency and duration of the AUX 1104 mode, the overall electricity consumption can be greatly reduced. An example of an algorithmic equation incorporating this penalty is described in greater detail below. Second, the upper/lower thresholds of the maintenance band 1108 can be increased to allow for wider temperature variations near the setpoint temperature. The overall effect is to reduce the number of heat pump cycles required to maintain the ambient temperature of the home near the setpoint temperature of the thermostat schedule.

Figure 12:
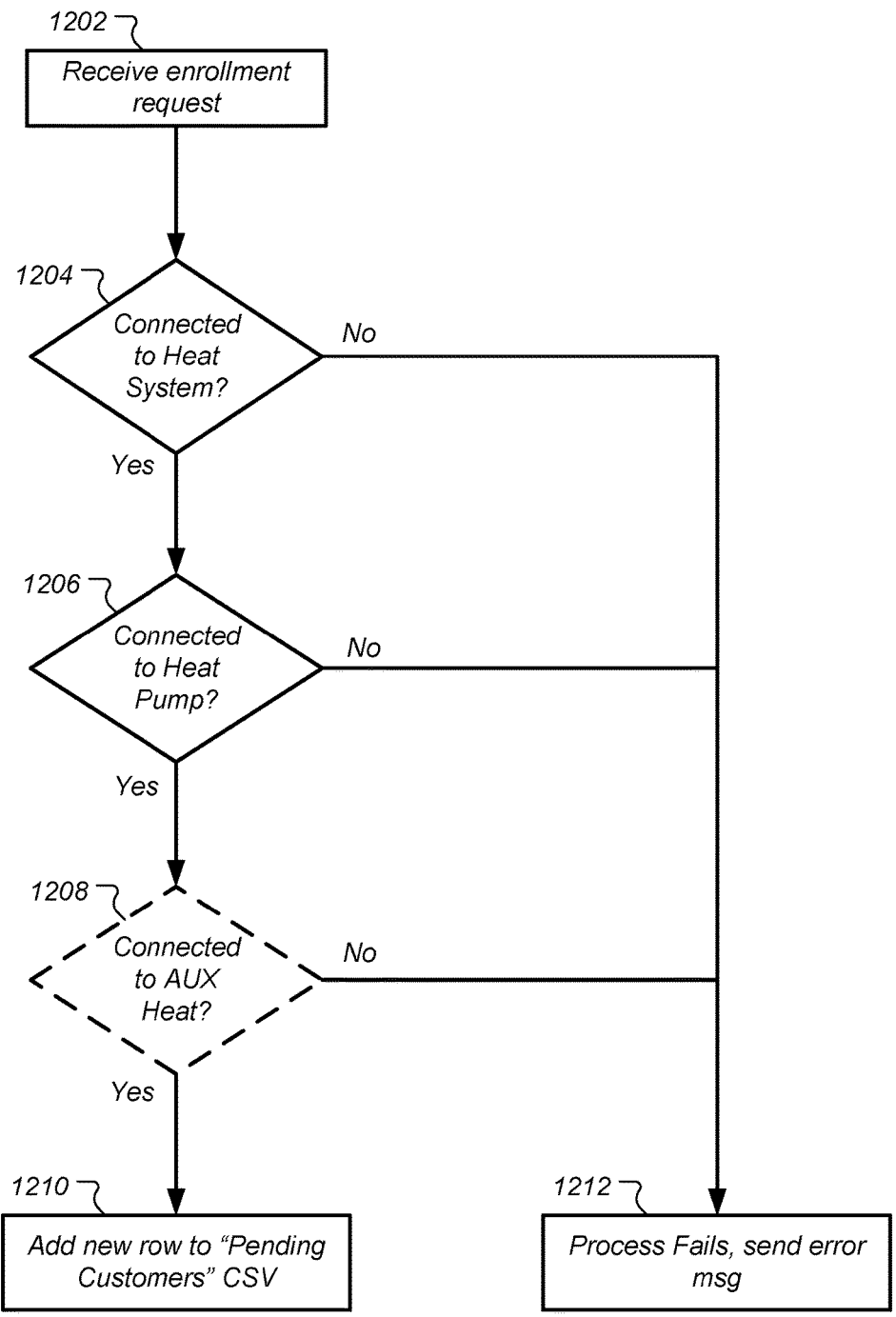
FIG. 12 illustrates a flowchart of a method for receiving an enrollment request for a winter demand response program.

FIG. 12 illustrates a flowchart of a method for receiving an enrollment request for a winter demand response program. The thermostat management system may receive an enrollment request (1202) for a thermostat account. The enrollment request may be received directly from the thermostat after interacting with the user through the user interface of the thermostat. Alternatively, the enrollment request may be received via email or other network indication not directly involving the thermostat, such as through a smartphone interface.

The thermostat management system can then make a series of determinations as to whether the thermostat account is capable of engaging in a winter demand response program. First, a determination can be made as to whether the home has at least one thermostat connected to a heating system (1204). The smart thermostat described in detail above includes wire insertion sensing circuitry that can be used to determine a configuration of an HVAC system to which the thermostat is connected. For example, by determining which wiring terminals on the thermostat (e.g., Y, W, Rc, etc.) have wires inserted therein, the thermostat can determine the functionality provided by the HVAC system. If the wiring configuration of the thermostat matches a known wiring configuration of an HVAC system that includes a heating system, the thermostat can transmit this configuration to the thermostat management server for use in the enrollment process.

The thermostat management server can then receive information that indicates whether the home includes at least one thermostat connected to a heat pump (1206). In some embodiments, the smart thermostat can automatically determine that it is connected to a heat pump by virtue of wire connections and monitoring the HVAC system operations. In some embodiments, the smart thermostat can additionally or alternatively accept user input indicating a fuel source. For example, during the setup procedure, the user interface of the thermostat can present a series of questions to a user that allows the user to respond by providing details about their HVAC system directly to the thermostat. The thermostat can then transmit this information to the thermostat management server for use in the enrollment process.

In some embodiments, the thermostat management server can also receive information indicating whether or not the heat pump has an AUX (stage II) function available. This determination may not be necessary in all embodiments, and the thermostat account can be enrolled in the winter demand response program without an AUX function. If each of these determinations succeed, the thermostat account can be enrolled in the winter demand response program (1210). In some embodiments, this may entail adding a new row for the thermostat account to a table/spreadsheet that can be reviewed/approved by the utility provider through a web interface portal provided by the thermostat management system. The utility provider can log into the web portal and approve new enrollees for different demand response scheduling programs. Alternatively, if the method determines that the thermostat account is not eligible for the winter demand response program, the enrollment process will fail and provide the user with an indication of the failure along with possible reasons for why the thermostat account could not be enrolled (1212).

Figure 13:
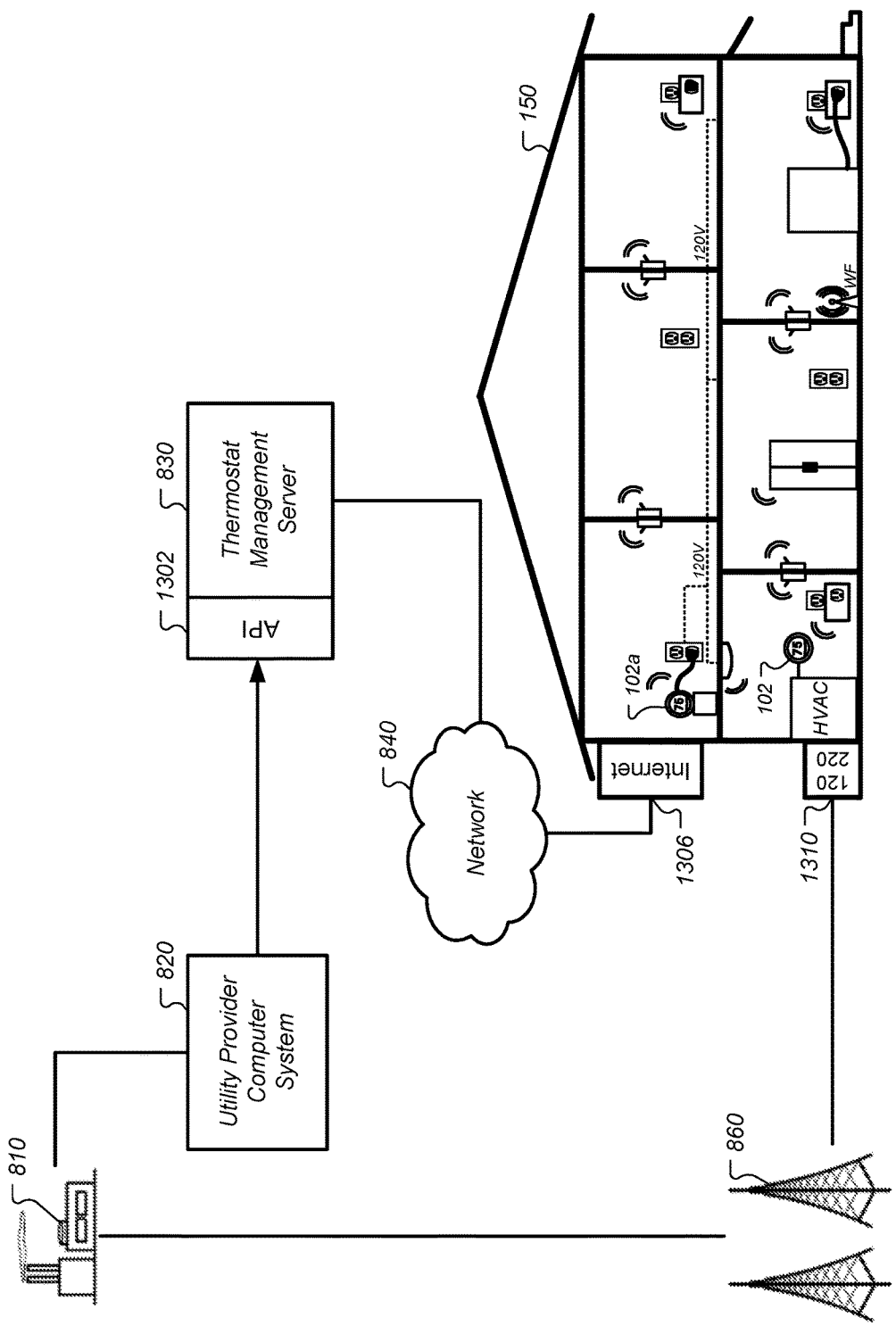
FIG. 13 illustrates an arrangement of systems for implementing a winter demand response feature, according to some embodiments.

FIG. 13 illustrates an arrangement of systems for implementing a winter demand response feature, according to some embodiments. A power generator 810 provides energy to a power distribution network 860. This is generally transmitted to a structure 150 through an electrical panel 1310 that provides 120 VAC/220 VAC to the structure 150. While this embodiment describes transmission of electrical power, this is merely illustrated by way of example and not meant to be limiting. Other embodiments may use a power generator 810 that provides a different type of utility, such as natural gas, and a power distribution network 860 specifically designed to transmit the different type of utility to the structure 150. The HVAC system, and specifically a heat pump, will utilize the electrical energy transmitted from the power distribution network 860.

In order to approve enrollees in a winter demand response program, and to initiate a demand response event, a custom API 1302 is designed for the thermostat management server 830 to receive input from the utility provider computer system 820. From the perspective of the utility provider computer system 820, initiating a demand response event may follow the same process regardless of whether it occurs during warm-weather months or during cold-weather months. In some embodiments, the utility provider computer system 820 requests a demand response event to be initiated at a particular time and for a particular duration. The utility provider computer system 820 may be presented with one or more groups of eligible homes to be selected as participants in each demand response event. The thermostat management server 830 can maintain groupings of different thermostat accounts and make them available through the custom API 1302 for selection based on possible energy reduction, user preference, etc., in order to meet the energy reduction needs of the utility provider computer system 820, while still maintaining user comfort. In some embodiments, the thermostat management server 830 can automatically select groups to participate in the demand response event, and thereby relieve the utility provider computer system 820 of the need to select participating groups.

After the utility provider computer system 820 provides the characteristics of the demand response event, the thermostat management server 830 can make a determination as to whether it should institute a winter demand response event or a summer demand response event based on real-time weather information. Additionally or alternatively, the thermostat management server 830 can receive information from individual thermostats 102 associated with each user account indicating whether they are set in a heating mode or in a cooling mode. In some embodiments, the utility provider computer system 820 can define a specific type of demand response event, indicating whether it should be a winter demand response event or a summer demand response event.

After receiving the demand response event, the thermostat management server 830 can store a demand response data structure in one or more synchronization buckets for each affected thermostat account. The synchronization buckets at the thermostat management server 830 are associated with corresponding user accounts tied to intelligent thermostats installed in corresponding structures 150. Periodically, such as every 15 minutes, the thermostat management server 830 can synchronize the synchronization buckets in the user account at the thermostat management server 830 with corresponding synchronization buckets on the individual thermostats. This communication can be performed through a network 840, such as the Internet, where the intelligent thermostat is accessible through a home Internet router 1306. After receiving the demand response event information from the synchronization buckets, the intelligent thermostat can alter its setpoint temperature schedule to reduce energy usage during the demand response interval. The specific algorithms performed by the thermostat will be described in greater detail below.

FIG. 14 illustrates a data structure 1402 for representing a demand response event definition, according to some embodiments. The complete data structure 1402 includes many data fields that can be populated by the thermostat, the thermostat management server, and/or provided by the utility provider computer system to be populated by the thermostat management system. (The utility provider computer system does not have direct access to the thermostats; the thermostat management server directly interacts with the thermostats.) However, for the sake of simplicity, many of the fields in the complete data structure 1402 have been omitted from FIG. 14. Generally, the fields in the data structure 1402 can be provided by the utility provider computer system to define the parameters of the demand response event. These parameters can then be inserted into the data structure 1402 by the thermostat management server. This information may include an identifier that uniquely identifies the instance of the demand response event, optimization parameters sent to the thermostat to influence the event, an event start time, an event end time, an event duration, and so forth. These existing fields 1404 may be generally applicable to demand response events occurring in cold-weather months or warm-weather months.

In order to accommodate demand response events during cold-weather months, some additional fields 1406 may be added to the data structure 1402. In some embodiments, the additional fields 1406 may include a fuel type indicating whether the event should be optimized for electric, gas, oil, propane, geothermal, and/or other fuel types to generate heat. Some embodiments may include an obey_preconditioning_setting that indicates whether the user's preconditioning setting should influence the preparation stage of the demand response event. Some embodiments may include a num_rollouts field that indicates the number of rollouts that should be performed by the thermostat controller on each re-evaluation cycle. The rollouts are effectively planned HVAC control decision points that are modeled out into the future. For example, the thermostat controller runs a series of rollouts in order to select an optimized control strategy for the demand response event given the weather, setpoint schedule, demand response event length, and so forth. Some embodiments may include a one_sided_temp_error field that indicates whether or not to use one-sided temperature error instead of double-sided temperature error when quantifying user discomfort. Some embodiments may include an obey_heatpump_lockouts field that determines whether the algorithm should respect the user's heat pump lockouts on systems that include an AUX stage. Some embodiments may include a use_one_sided_temp_error feel that determines whether the thermostat should honor the user's dual fuel breakpoint on dual fuel systems.

Figure 15:
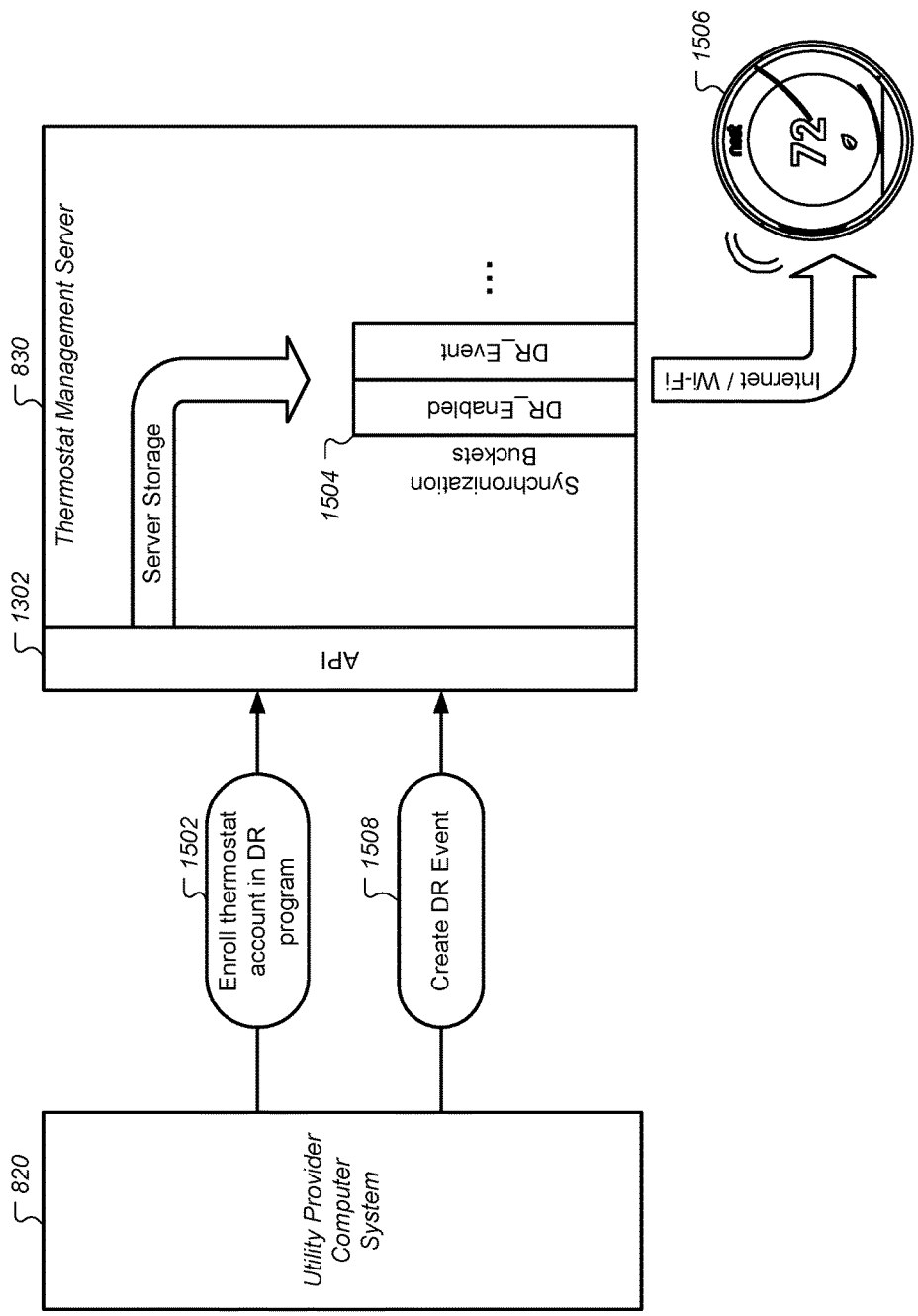
FIG. 15 illustrates a block diagram of how information is received through the API of the thermostat management server and stored in synchronization buckets for transmission to the thermostat, according to some embodiments.

The data structure 1402 defining the demand response event and customizing the demand response event for a particular thermostat can be stored by the thermostat management server in one of the synchronization buckets of the corresponding thermostat account. FIG. 15 illustrates a block diagram of how information is received through the API of the thermostat management server and stored in synchronization buckets for transmission to the thermostat, according to some embodiments. As described above in relation to FIG. 12, the initial enrollment process for a winter demand response program may include providing, by the utility provider computer system 820, an instruction to enroll a thermostat account in a demand response program that includes winter demand response events (1502). During winter months, the utility provider computer system 820 can also use the API 1302 of the web portal provided by the thermostat management server 830 to create a demand response event (1508).

Upon receipt of the demand response event, the thermostat management server 830 can generate a data structure described above in relation to FIG. 14 that is populated with the specifics of the DR event provided by the utility provider computer system 820. A copy of this data structure can then be placed in synchronization buckets for each thermostat account that has been selected to participate in the demand response event. At this point, each copy of the data structure can be populated with thermostat-specific information provided from each individual thermostat account. The thermostat management server 830 can include a customer account database that stores the serial number of each thermostat, a structure ID, various rate plans, and/or any other information provided by the utility provider computer system 820 and/or the individual thermostats 1506. Each user account may also include user account information used specifically by the thermostat management server 830 to interact with the thermostats 1506. This may include MAC/IP addresses for the thermostat, and information recorded by the thermostat 1506, such as user schedules, occupancy information, temperature profiles, and so forth.

In order to simplify transmissions between the thermostat management server 830 and each of the thermostats 1506, information including the demand response data structure may be stored in a plurality of synchronization buckets 1504. The synchronization buckets 1504 may include a plurality of memory locations that are synchronized between the thermostat management server 830 and corresponding memory locations in a memory device of the thermostats 1506. Periodically, the thermostats 1506 may connect with the thermostat management server 830 through the Internet or other available network to synchronize the synchronization buckets. New information provided by the thermostat management server 830 can be downloaded to corresponding synchronization buckets on each of the thermostats 1506, while new information recorded by the thermostat 1506 can be uploaded to the corresponding synchronization buckets 1504 at the thermostat management server 830.

In some embodiments, the synchronization buckets 1504 may include a Boolean value indicating whether the demand response events are authorized for each of the thermostats 1506, and/or the demand response data structure itself. It will be understood that many other synchronization buckets may also be present at the thermostat management server that are not explicitly shown in FIG. 15. In some embodiments, the buckets may be synchronized periodically using time intervals that are less than or equal to a minimum lead time for which the utility provider computer system is required to provide the demand response event requests before the beginning of the demand response interval. Synchronizing these buckets may be a primary way in which the demand response event notification is transmitted to the thermostat.

Figure 16:
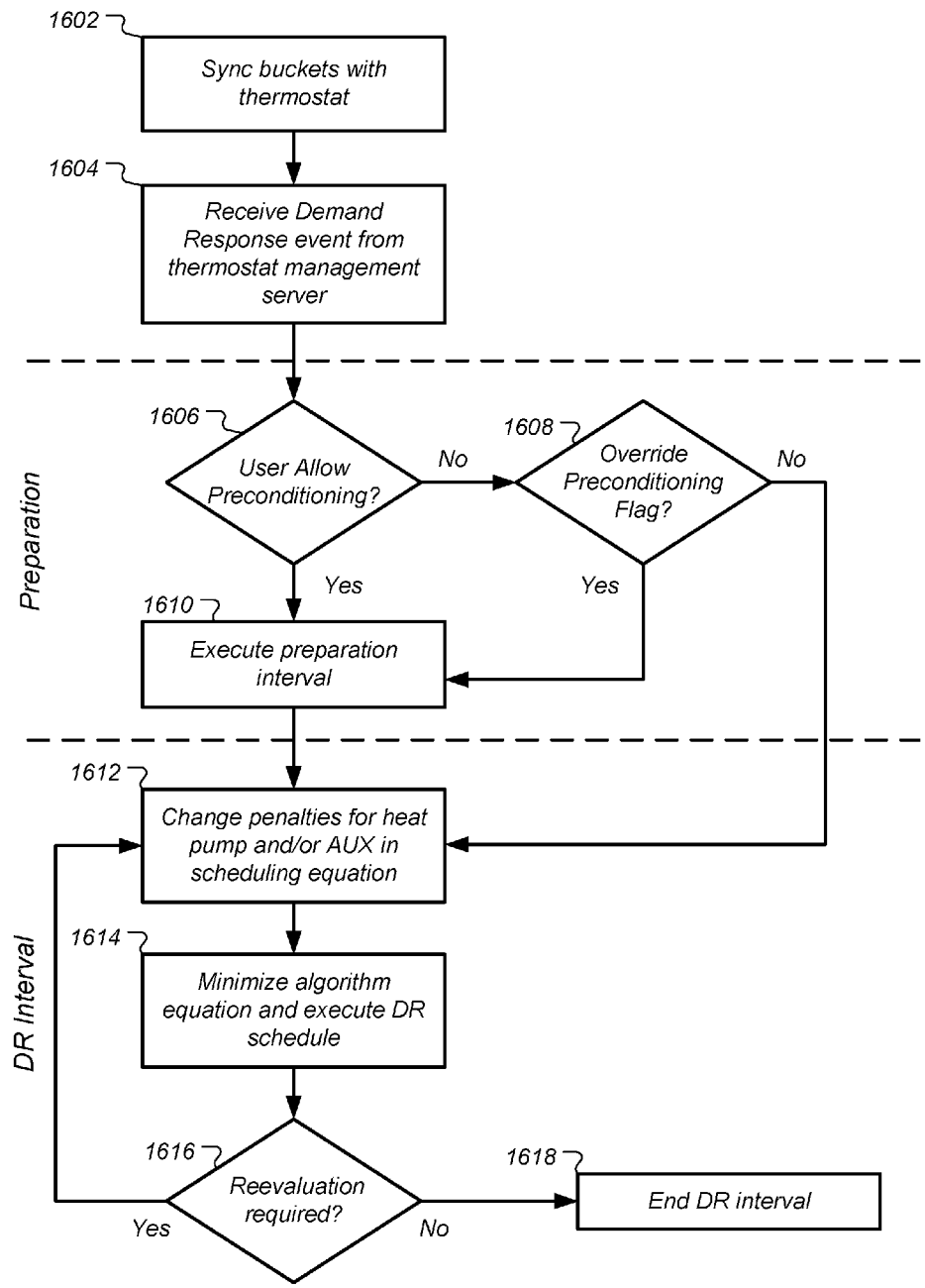
FIG. 16 illustrates a method for responding to a winter demand response event by a thermostat, according to some embodiments.

FIG. 16 illustrates a method for responding to a winter demand response event by a thermostat, according to some embodiments. As described above, the thermostat can synchronize memory location buckets with the thermostat management server (1602). By extracting information from the synchronization buckets, the thermostat can receive a definition and indication of the demand response event from the thermostat management server (1604). The demand response event can be received during winter months, which may be defined in some embodiments as between the months of December and March. Additionally, the demand response event can be received that any time when the thermostat is operating in a "heat mode" where the thermostat periodically causes the HVAC system to activate a heating function to heat an enclosure based at least in part on a stored setpoint schedule. The "heat mode" can be contrasted with an "cooling mode" where the thermostat periodically causes the check system to activate an air-conditioning function to cool the enclosure. In some thermostats, the thermostat can simultaneously be in a heat mode and in a cooling mode at the same time.

Generally, the response of the thermostat to the demand response event can be broken up into two different phases: preparation for the demand response interval, and the demand response interval itself. During the preparation phase, the thermostat treats the home like a thermal "battery," storing heat before the demand response interval such that less energy needs to be used during the demand response interval. However, this is not as simple as just preheating the home, particularly for demand response events that occur in the early morning hours. Preheating the home can disrupt users sleep, either through an increase in ambient temperature or through noise from the HVAC system. Additionally, many users reduce their setpoint temperature at night and allow their home to cool in order to save energy. Turning on the HVAC system at night can make the thermostat appear to operate inefficiently. Therefore, the thermostat may need to determine whether or not the users would be disturbed by the thermostat preheating the home by analyzing user settings that indicate user preferences, as will be described in greater detail below.

The intelligent thermostat described above comprises a "preconditioning" feature that users can enable. This feature may also be referred to as "early on," and is a feature that is independent of demand response events. Instead, "early on" is a setting that operates with scheduled setpoints during normal operation. During normal operation, the thermostat evaluates a setpoint temperature at the time of the setpoint temperature. If the ambient temperature is below the setpoint temperature, the HVAC system is triggered to keep the home up to the setpoint temperature. Thus, it may take an appreciable amount of time after a setpoint occurs for the house to reach the setpoint temperature. However, the preconditioning feature aims to heat the home to the setpoint temperature such that the ambient temperature in the home arrives at the setpoint temperature approximately at the time the setpoint occurs. Over time, the thermostat generates a thermal model of the home and determines heating characteristics and capacities of the HVAC system. Based on the characteristics of the HVAC system and the thermal model of the home, the thermostat can estimate a time-to-temperature. Based on this estimation, the thermostat can see an upcoming setpoint in the setpoint schedule and begin healing the home before the setpoint occurs such that the setpoint temperatures reached at the setpoint time. For example, consider an ambient temperature in the home of 65° with a setpoint of 75° at 7:00 AM. Without preconditioning, the thermostat would begin heating the home from 65° at 7:00 AM. With preconditioning, the thermostat would estimate a time it would take to heat the home from 65° to 75° (e.g., 45 minutes), and begin heating the home earlier (e.g., 6:15 AM) such that the home was 75° at 7:00 AM.

Preconditioning is a feature that can be enabled and disabled by a user. It can be assumed that if preconditioning is enabled that the user will not mind the heater turned on before a scheduled setpoint. Because scheduled setpoints in the morning will often coincide with the beginning of a demand response interval requested by the utility provider, preheating the home before the demand response interval should not be too disruptive for users with preconditioning enabled.

The preparation phase of the method may therefore determine whether or not the user allows preconditioning (1606). If the user does not allow preconditioning, a determination can be made as to whether or not the thermostat management server has instructed the thermostat to override the preconditioning flag set by the user (1608). Recall that the data structure includes an obey_preconditioning_setting field that allows the algorithm to either honor or override the user setting for preconditioning during the preparation phase. If preconditioning is not enabled and is not authorized to be overridden, the method may proceed directly to the demand response interval phase at the beginning of the demand response interval time (1612). If preconditioning is allowed or can be overridden, the method can execute a preparation interval (1610). In some embodiments, the preparation interval can begin preheating the home similar to what takes place in the "early on" preconditioning, but without relying on a future scheduled setpoint to activate the HVAC system. In some embodiments, the preconditioning determination need only be made during a morning demand response interval. For afternoon demand response intervals, preheating can occur without determining whether the user allows preconditioning.

In some embodiments, the preparation phase can include an increase in a nighttime setback temperature of the thermostat schedule. When most users go to bed, they set their thermostat to automatically reduce the setpoint temperature such that the house will cool at night. By maintaining a slightly higher nighttime setback temperature, the HVAC system may need to operate more frequently, however, the amount of energy required to heat the home to a morning setpoint that roughly corresponds with the demand response interval will be significantly less. Specifically, by raising the nighttime setback temperature, heating the home to the morning setpoint temperature can often be accomplished without using the AUX stage of a heat pump, which is much more costly than using the heat pump (stage 1) alone.

In some embodiments, a penalty associated with the AUX function can also be increased during the preparation phase such that the AUX function is only required in rare circumstances. Normally, the AUX function will be activated by the thermostat when a large difference between the ambient temperature in the setpoint temperature exists. This large temperature difference often occurs in the morning when the home needs to be heated to the morning setpoint temperature from the nighttime setback temperature. The AUX may also turn on during extreme cold weather events when normal heat pump operation is not able to keep up with the loss of heat from the home. Thus, the AUX function is commonly activated during this time that will often correspond to a demand response interval. By increasing the penalty associated with the AUX function, the control algorithm of the thermostat can be conditioned to only turn on the AUX when a drastic temperature difference occurs that cannot be overcome by the heat pump (stage 1) alone.

By heating during the preparation phase, thermal energy can be stored in the house and used during the demand response interval to reduce the amount of electricity required to maintain a higher setpoint temperature. At the beginning of the DR interval, an equation used by the thermostat control algorithm to govern the behavior of the thermostat during a demand response interval can be modified to reduce energy usage (1612). As will be described in greater detail below, the thermostat can minimize the equation in order to determine when the heat pump should be turned on, when the AUX function should be activated, and so forth (1614). During the demand response interval, the thermostat can re-evaluate the minimization of the equation repeatedly to ensure that changes in the predicted temperature trajectory of the home do not overly affect user comfort (1616). Periodic re-evaluation can continue until the end of the demand response interval (1618).

Besides adjusting the penalties applied to different factors in the control equation, some embodiments may also make additional adjustments to the thermostat operation during the demand response interval. For example, some embodiments may switch between single-sided and double-sided temperature error calculations. Some embodiments may decrease a lower maintenance band during the preparation interval and/or the demand response interval. Some embodiments may increase an upper maintenance band during the preparation interval and/or the demand response interval. Some embodiments may also increase/decrease the number of rollouts to perform during re-evaluation. Each of these additional operations may be performed in any combination and without limitation along with the adjustments to the control equation minimized by the thermostat.

FIG. 17 illustrates a portion of a control equation used by the thermostat to control operations during the demand response interval, according to some embodiments. Among other factors, the control equation includes a user comfort factor 1704, a heat pump cost factor 1708, and an AUX stage cost factor 1712. Each of these factors translates the relative "cost" of each factor into a numerical value that can be compared to other factors. Note that the cost is not a financial cost, but rather a simple numerical representation that can be used to relate factors that normally are difficult to compare, such as user comfort and heat pump operation. It will be understood that the control equation may include additional factors that are not represented explicitly in FIG. 17.

In addition to each of the factors 1704, 1708, 1712, the control equation may also include corresponding weights, 1702, 1706, 1710. The weights can be adjusted dynamically during operation of the thermostat to increase/decrease the importance of various factors in the control equation. For example, during the demand response interval, a penalty for using the AUX function can be represented by increasing the weight 1710 associated with the AUX stage cost factor 1712. Conversely, the importance of user comfort can be decreased by decreasing the weight 1702 associated with the user comfort factor 1704.

Figure 18:
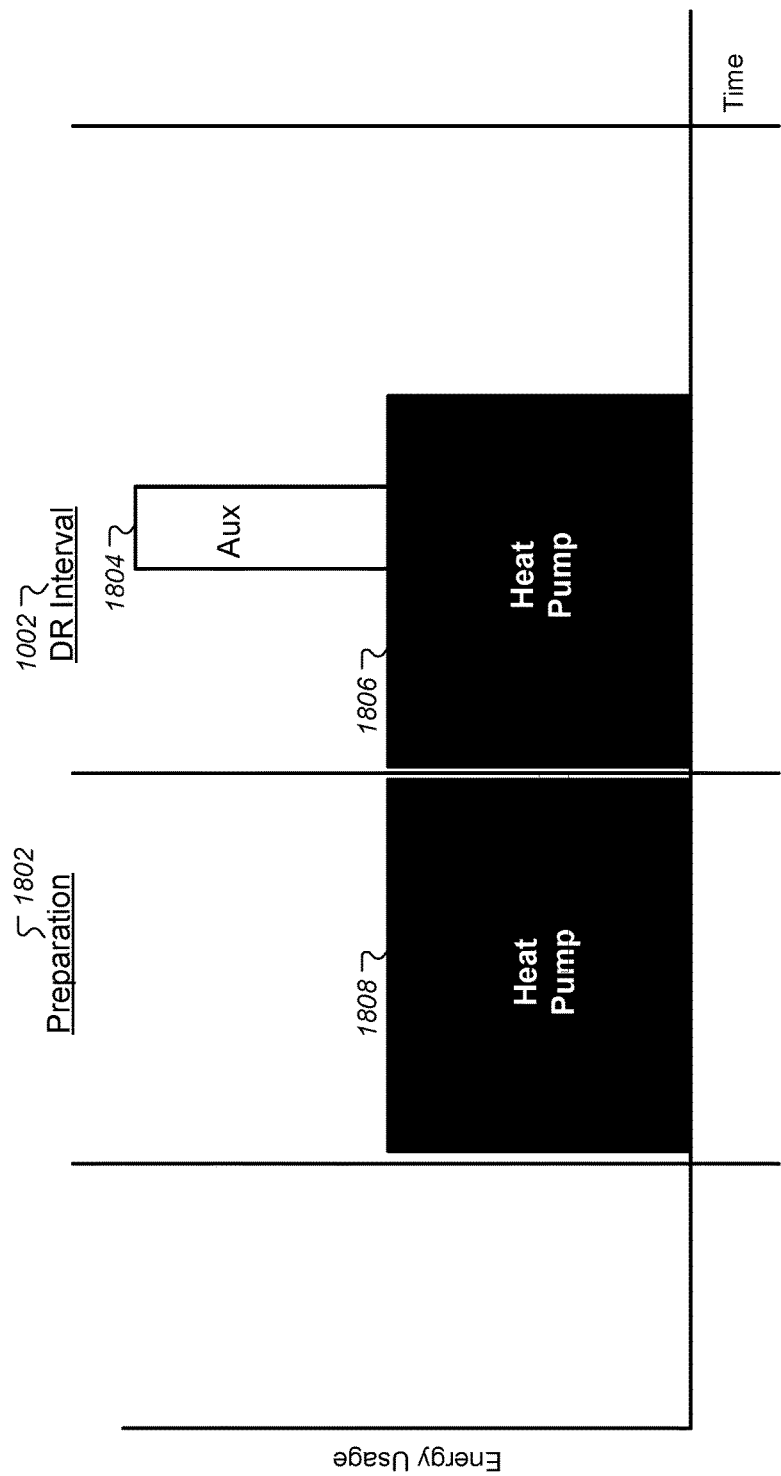
FIG. 18 illustrates a usage diagram for the heat pump and the AUX function during the preparation and demand response intervals.

During the demand response interval and/or the preparation interval, the main method of reducing energy usage may be to adjust the weights 1702, 1706, 1710 in the control function to reduce the importance of user comfort and/or increase the cost of using the heat pump and/or the AUX function. For example, some embodiments may increase the cost of using the AUX function between 10× and 25× during the demand response interval and/or the preparation interval. FIG. 18 illustrates a usage diagram for the heat pump and the AUX function during the preparation and demand response intervals. During the preparation interval 1802, the increased penalty for using the AUX function means that only the heat pump function is used. This may be combined with an increase in the nighttime setback temperature such that not as much heat needs to be generated to reach the morning setpoint temperature. During the demand response interval 1002, the heat pump continues to operate until the setpoint temperatures reached. At some point during the demand response interval 1002, the AUX function may still operate for a few minutes, however, the increased penalty will generally minimize its use.

Figure 19:
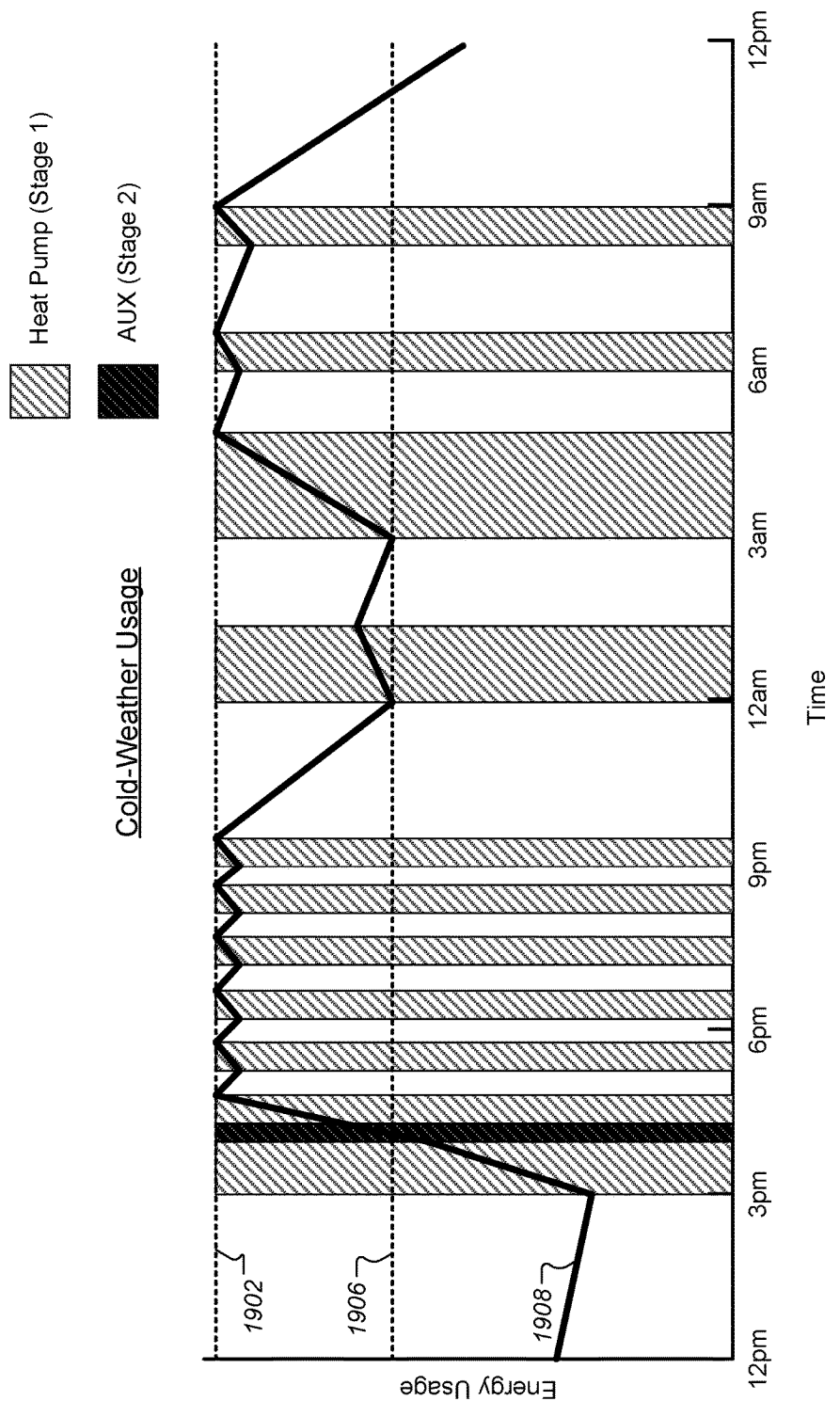
FIG. 19 illustrates a 24 hour cycle that reduces energy usage for morning and evening winter demand response intervals, according to some embodiments.

FIG. 19 illustrates a 24 hour cycle that reduces energy usage for morning and evening winter demand response intervals, according to some embodiments. This usage graph illustrates actual results from the algorithm of FIG. 16 and the minimization of the control function of FIG. 17. Several observations can be made from these data. First, the AUX function only operates a single time at approximately 4:00 PM. Without the increase in the cost of using the AUX function, the AUX would typically operate 4-5 times during the same 24 hour cycle. Specifically, the AUX function would typically be activated during the early morning hours as the home heats up.

Second, a nighttime setback temperature 1906 can be generally increased from an original setting. The effect of this increased setback temperature is increasing the frequency of the heat pump turning on between midnight and 6:00 AM. However, this is coupled with a decrease the amount of heat pump/AUX usage to heat the home at 6:00 AM during the morning demand response interval. Finally, a maintenance band around the setpoint temperature 1902 during the demand response intervals has been increased, allowing greater variation in temperature around the setpoint temperature 1902.

FIGS. 19-22 illustrate various user interfaces that can be provided on the thermostat and/or a mobile computing device to interact with a winter demand response event. After installing the thermostat and downloading the synchronization buckets from the thermostat management server indicating a particular demand charge, the thermostat can inform the customer that the winter demand response program will be in effect. This user interface can be used to inform the user that the thermostat will automatically adjust setpoints in order to save energy during the demand response intervals. Additional information can be provided to a user through the "More Info" menu item. As described above, the Nest Learning Thermostat described above may be connected via one or more wireless networks to an app operating on a customer's smart-phone device. Not only is the customer able to view the status of the thermostat and control the temperature, but the customer is also able to receive information about the winter demand response program described herein.

Figure 20:
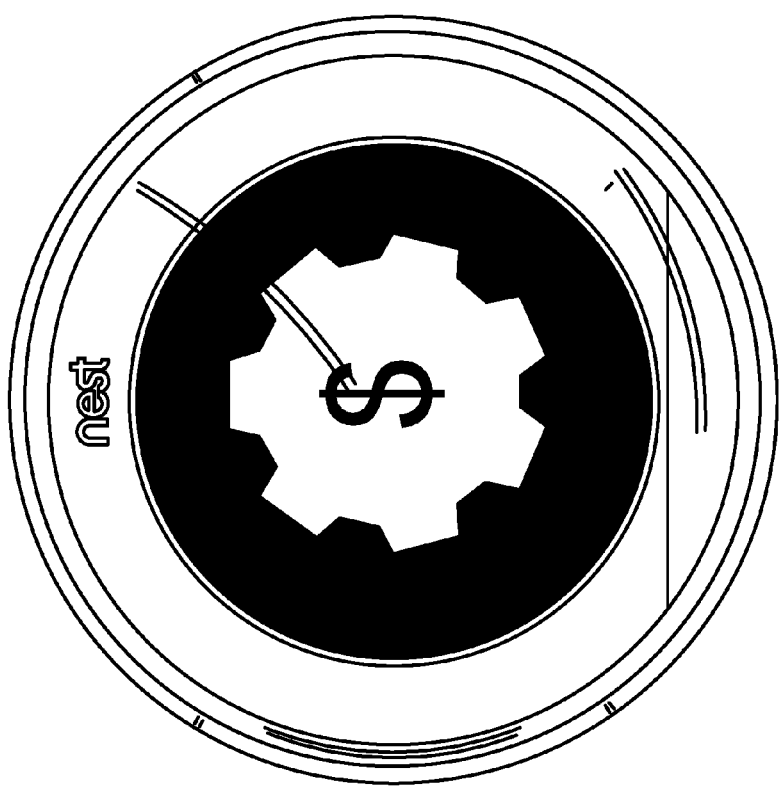
FIG. 20 illustrates an embodiment of a thermostat in what is referred to as a "Farsight" mode, according to some embodiments.

In some embodiments, it may be desirable to keep the user informed in real time as the demand response adjustments to the schedule are in effect. FIG. 20 illustrates an embodiment of a thermostat in what is referred to as a "Farsight" mode, according to one embodiment. In this mode, the thermostat has not detected a user approaching the thermostat with an intent to interact with the user interface of the thermostat. Therefore, the user interface can display a larger icon or message that can be read from a great distance. In this embodiment, a demand response icon can be used to indicate that the thermostat is currently operating more efficiently during a demand response interval, and that the thermostat has automatically adjusted temperature setpoints during the demand response interval.

Figure 21B:
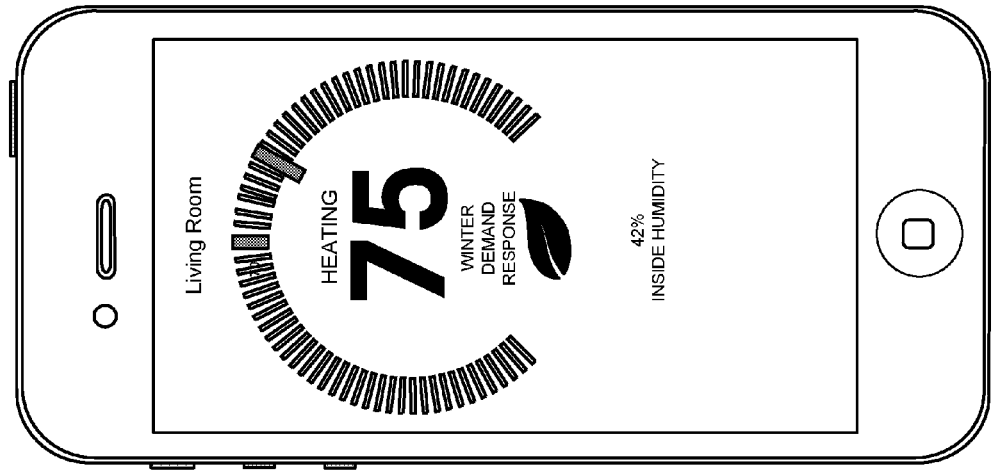
FIG. 21B illustrates a similar user interface displayed on a mobile device display.
Figure 21A:
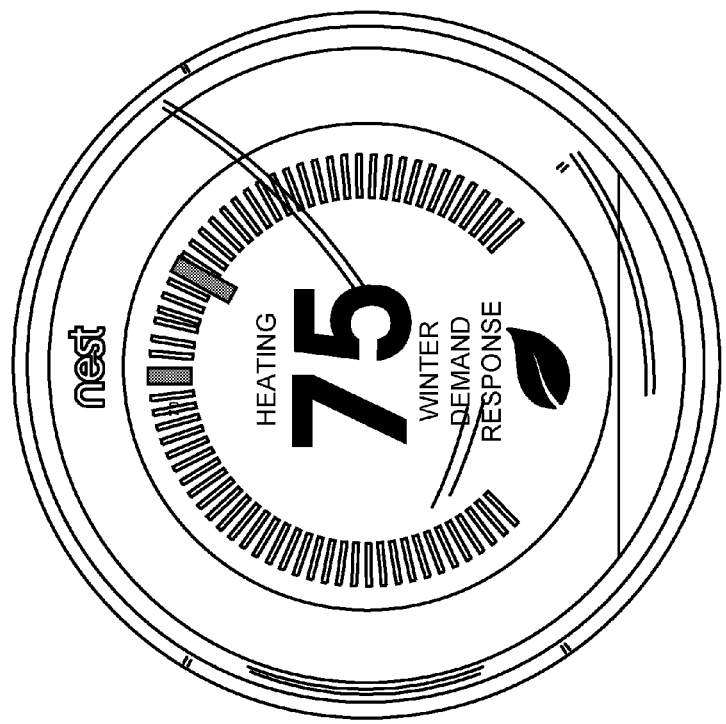
FIG. 21A illustrates a user interface of a thermostat in an active mode while the charge guard feature is operative, according to some embodiments.

FIG. 21A illustrates a user interface of a thermostat in an active mode while the winter demand response feature is operative, according to some embodiments. The features of the depicted user interface, such as the "heating" indicator, the current temperature, and the target temperature with the dial around the exterior of the interface, are all existing features of the thermostat. These features may be displayed when a user approaches the thermostat with an intent to interact with the user interface. When the demand response function is active, the "demand response" text can be displayed with the icon from the Farsight interface described above. This serves to indicate to the user that the demand response function is active, and that any adjustment of the setpoints will disrupt the cost savings that would otherwise be realized by the demand response function. FIG. 21B illustrates a similar user interface displayed on a mobile device display.

Figure 22B:
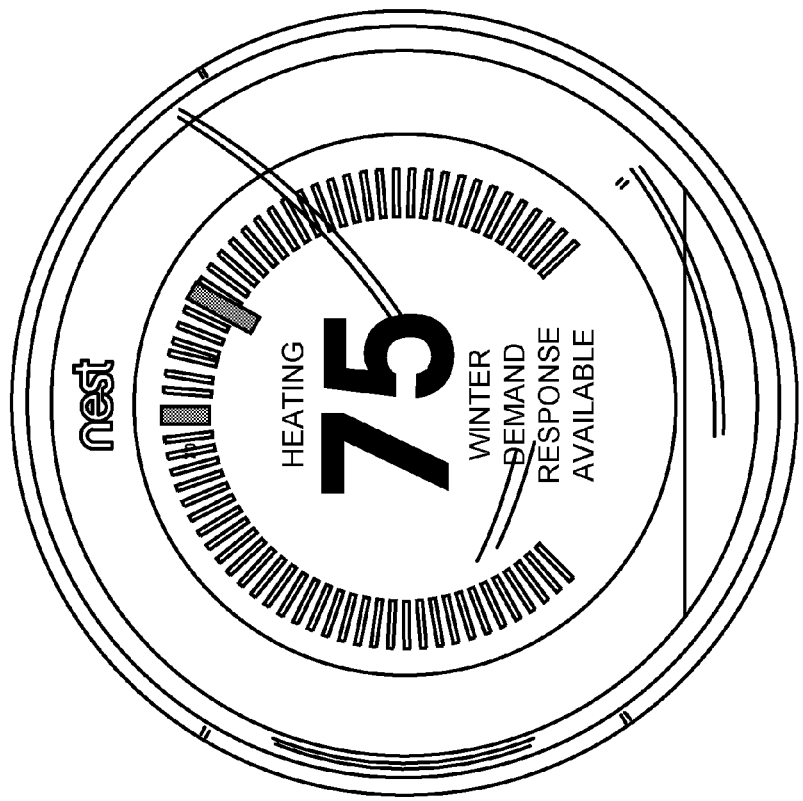
FIG. 22B illustrates a user interface that may be displayed when the charge guard function is available but not active.
Figure 22A:
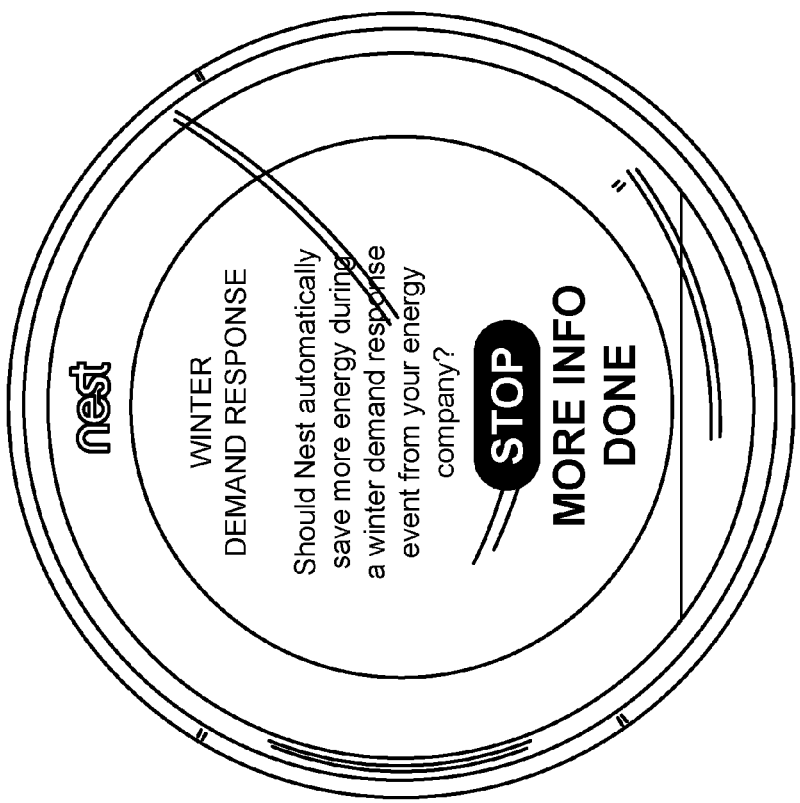
FIG. 22A illustrates a user interface that may be displayed when a user attempts to adjust the temperature setting while the charge guard function is active, according to some embodiments.

FIG. 22A illustrates a user interface that may be displayed when a user attempts to adjust the temperature setting while the demand response function is active, according to some embodiments. This user interface may be referred to as a "speedbump" that forces the user to consider the ramifications of a temperature adjustment, or to simply remind the user that a demand response event is active. If the user continues to adjust the temperature after the speedbump, the demand response feature can be turned off. FIG. 22B illustrates a user interface that may be displayed when the demand response function is available but not active. In this user interface, the "Demand Response" text indicator may still be displayed, thereby indicating that the thermostat is no longer automatically controlling the temperature based on the demand response event and to remind the user that there are still capacity constraints currently in place by the energy provider. However, the demand response icon may be removed indicating that the demand response function is not currently operating due to the user temperature adjustments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific apparatuses and methods, it is to be clearly understood that this description is made only by way of example and not as limitation on the scope of the present teachings.

What is claimed is:

1. A thermostat comprising:
a housing;
one or more memory devices comprising a stored setpoint schedule, wherein the stored setpoint schedule comprises a plurality of setpoints;
one or more temperature sensors, each of the one or more temperature sensors being configured to provide temperature sensor measurements;
a processing system disposed within the housing, the processing system being configured to be in operative communication with the one or more temperature sensors to receive the temperature sensor measurements, in operative communication with the one or more memory devices to determine a setpoint temperature, and in still further operative communication with a heating, ventilation, and air conditioning (HVAC) system to control the HVAC system based at least in part on the setpoint temperature and the temperature sensor measurements;
wherein the processing system is programmed or configured to control the HVAC system by performing operations comprising:
operating in a heat mode wherein the thermostat periodically causes the HVAC system to activate a heating function to heat an enclosure based at least in part on the stored setpoint schedule;
receiving an indication from a thermostat management server of a demand response event while the thermostat is operating in the heat mode;
determining whether the thermostat stores a user setting indicating that the thermostat should preheat the enclosure prior to reaching a scheduled setpoint in the stored setpoint schedule; and
preheating the enclosure prior to the demand response event based on a determination that the thermostat stores the user setting indicating that the thermostat should preheat the enclosure prior to reaching the scheduled setpoint in the stored setpoint schedule.

2. The thermostat of claim 1, wherein the demand response event comprises a winter demand response event occurring between December and March.

3. The thermostat of claim 1, wherein the user setting indicating that the thermostat should preheat the enclosure prior to reaching the scheduled setpoint utilizes a time-to-temperature calculation based on a thermal model of the enclosure and heating characteristics of the HVAC system.

4. The thermostat of claim 1, wherein the processing system is programmed or configured to perform additional operations comprising:
increasing a nighttime setback temperature prior to the demand response event.

5. The thermostat of claim 1, wherein the processing system is programmed or configured to perform additional operations comprising:
reducing the likelihood that an AUX function of a heat pump of the HVAC system will operate while preheating the enclosure prior to the demand response event.

6. The thermostat of claim 1, wherein the processing system is programmed or configured to perform additional operations comprising:
minimizing a control function during the demand response event, wherein the control function comprises:
a first function representing operation of a heat pump;
a second function representing operation of an AUX function; and
a third function representing a numerical representation of user comfort.

7. The thermostat of claim 6, wherein the processing system is programmed or configured to perform additional operations comprising:
increasing a weight applied to the second function representing operation of an AUX function during the demand response event.

8. The thermostat of claim 7, wherein the weight applied to the second function is increased between 10× and 25× during the demand response event.

9. The thermostat of claim 7, wherein the processing system is programmed or configured to perform additional operations comprising:
increasing a weight applied to the first function representing operation of a heat pump during the demand response event.

10. The thermostat of claim 1, wherein the processing system is programmed or configured to perform additional operations comprising:
increasing an upper or lower bound of a maintenance band around a setpoint temperature during the demand response event.

11. A method of using a thermostat to control an HVAC system during cold weather, the method comprising:
storing a stored setpoint schedule in one or more memory devices of the thermostat, wherein the stored setpoint schedule comprises a plurality of setpoints;
receiving temperature sensor measurements from one or more temperature sensors;
controlling a heating, ventilation, and air conditioning (HVAC) system using a processing system of the thermostat, the processing system being configured to be in operative communication with the one or more temperature sensors to receive the temperature sensor measurements, in operative communication with the one or more memory devices to determine a setpoint temperature, and in still further operative communication with HVAC system to control the HVAC system based at least in part on the setpoint temperature and the temperature sensor measurements;
operating, by the processing system, the thermostat in a heat mode wherein the thermostat periodically causes the HVAC system to activate a heating function to heat an enclosure based at least in part on the stored setpoint schedule;
receiving, by the processing system, an indication from a thermostat management server of a demand response event while the thermostat is operating in the heat mode;
determining, by the processing system, whether the thermostat stores a user setting indicating that the thermostat should preheat the enclosure prior to reaching a scheduled setpoint in the stored setpoint schedule; and
preheating, by the processing system, the enclosure prior to the demand response event based on a determination that the thermostat stores the user setting indicating that the thermostat should preheat the enclosure prior to reaching the scheduled setpoint in the stored setpoint schedule.

12. The method of claim 11, wherein the demand response event comprises a winter demand response event occurring between December and March.

13. The method of claim 11, wherein the user setting indicating that the thermostat should preheat the enclosure prior to reaching the scheduled setpoint utilizes a time-to-temperature calculation based on a thermal model of the enclosure and heating characteristics of the HVAC system.

14. The method of claim 11, further comprising:
increasing a nighttime setback temperature prior to the demand response event.

15. The method of claim 11, further comprising:
reducing the likelihood that an AUX function of a heat pump of the HVAC system will operate while preheating the enclosure prior to the demand response event.

16. The method of claim 11, further comprising:
minimizing a control function during the demand response event, wherein the control function comprises:
a first function representing operation of a heat pump;
a second function representing operation of an AUX function; and
a third function representing a numerical representation of user comfort.

17. The method of claim 16, further comprising:
increasing a weight applied to the second function representing operation of an AUX function during the demand response event.

18. The method of claim 17, wherein the weight applied to the second function is increased between 10× and 25× during the demand response event.

19. The method of claim 17, further comprising:
increasing a weight applied to the first function representing operation of a heat pump during the demand response event.

20. The method of claim 11, further comprising:
increasing an upper or lower bound of a maintenance band around a setpoint temperature during the demand response event.

* * * * *